(12) United States Patent
Hasumi

(10) Patent No.: US 11,577,615 B2
(45) Date of Patent: Feb. 14, 2023

(54) ELECTRIC ASSIST SYSTEM AND ELECTRIC ASSIST VEHICLE

(71) Applicant: YAMAHA HATSUDOKI KABUSHIKI KAISHA, Iwata (JP)

(72) Inventor: Mitsuharu Hasumi, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 331 days.

(21) Appl. No.: 16/810,980

(22) Filed: Mar. 6, 2020

(65) Prior Publication Data
US 2020/0207216 A1  Jul. 2, 2020

Related U.S. Application Data

(63) Continuation of application No. PCT/JP2017/033529, filed on Sep. 15, 2017.

(51) Int. Cl.
*B60L 15/20* (2006.01)
*B62M 6/50* (2010.01)
(Continued)

(52) U.S. Cl.
CPC .............. *B60L 15/20* (2013.01); *B62M 6/50* (2013.01); *B62M 9/04* (2013.01); *B60L 2200/12* (2013.01); *B60L 2240/12* (2013.01); *B60L 2240/14* (2013.01); *B60L 2240/421* (2013.01); *B62M 6/90* (2013.01)

(58) Field of Classification Search
CPC .. B60L 15/20; B60L 2200/12; B60L 2240/12; B60L 2240/14; B60L 2240/421; B60L 50/20; B62M 6/50; B62M 6/90; B62J 45/413
See application file for complete search history.

(56) References Cited

U.S. PATENT DOCUMENTS

| 5,857,537 A | 1/1999 | Matsumoto et al. |
| 2008/0035398 A1* | 2/2008 | Shirazawa ............ B60W 10/08 903/902 |

(Continued)

FOREIGN PATENT DOCUMENTS

| CN | 101509936 A | 8/2009 |
| CN | 103303317 A | 9/2013 |

(Continued)

OTHER PUBLICATIONS

Official Communication issued in corresponding Chinese Patent Application No. 201780094777.0, dated Nov. 24, 2020.

(Continued)

*Primary Examiner* — Bickey Dhakal
(74) *Attorney, Agent, or Firm* — Keating and Bennett, LLP

(57) ABSTRACT

An electric assist system usable for an electric assist bicycle includes an electric motor that generates assist power assisting human power of a rider of the electric assist bicycle, a rotation sensor that outputs a signal in accordance with a rotation of a rotatable component that rotates to operate the electric assist bicycle, an acceleration sensor that outputs a signal in accordance with an acceleration of the electric assist bicycle in a traveling direction thereof, and a controller that calculates a speed of the electric assist bicycle based on an output signal of the rotation sensor and an output signal of the acceleration sensor.

19 Claims, 9 Drawing Sheets

(51) Int. Cl.
    *B62M 9/04*       (2006.01)
    *B62M 6/90*       (2010.01)

(56) References Cited

U.S. PATENT DOCUMENTS

| | | |
|---|---|---|
| 2009/0205401 A1 | 8/2009 | Munko et al. |
| 2011/0278909 A1 | 11/2011 | Chen et al. |
| 2013/0311019 A1 | 11/2013 | Tanaka et al. |
| 2013/0317679 A1 | 11/2013 | Tanaka et al. |
| 2015/0352973 A1* | 12/2015 | Gao .................. B60L 1/003 318/139 |
| 2015/0375719 A1 | 12/2015 | Zhang et al. |
| 2016/0010747 A1 | 1/2016 | Kamiyamaguchi et al. |
| 2018/0257740 A1 | 9/2018 | Kikkawa |

FOREIGN PATENT DOCUMENTS

| | | |
|---|---|---|
| CN | 103373433 A | 10/2013 |
| CN | 104627313 A | 5/2015 |
| CN | 105073526 A | 11/2015 |
| DE | 696 17 770 T2 | 8/2002 |
| EP | 2 878 526 A1 | 6/2015 |
| EP | 2 918 490 A1 | 9/2015 |
| EP | 3 025 898 A1 | 6/2016 |
| EP | 3025898 A1 * | 6/2016 ............ B60L 11/007 |
| JP | 09-226664 A | 9/1997 |
| JP | 2002-160616 A | 6/2002 |
| JP | 2005-132274 A | 5/2005 |
| JP | 2011-073638 A | 4/2011 |
| JP | 2013-241045 A | 12/2013 |
| JP | 2013-244864 A | 12/2013 |
| JP | 5595424 B2 | 9/2014 |
| JP | 2014-211351 A | 11/2014 |
| JP | 2014211351 A * | 11/2014 |
| JP | 2015-174539 A | 10/2015 |
| JP | 2016-008004 A | 1/2016 |
| JP | 2016-028205 A | 2/2016 |
| KR | 10-2013-0102920 A | 9/2013 |
| KR | 20200046277 A * | 7/2020 |
| TW | 201351873 A | 12/2013 |
| TW | 201400357 A | 1/2014 |
| WO | 2010/091323 A1 | 8/2010 |

OTHER PUBLICATIONS

Official Communication issued in International Patent Application No. PCT/JP2017/033529, dated Nov. 7, 2017.

* cited by examiner

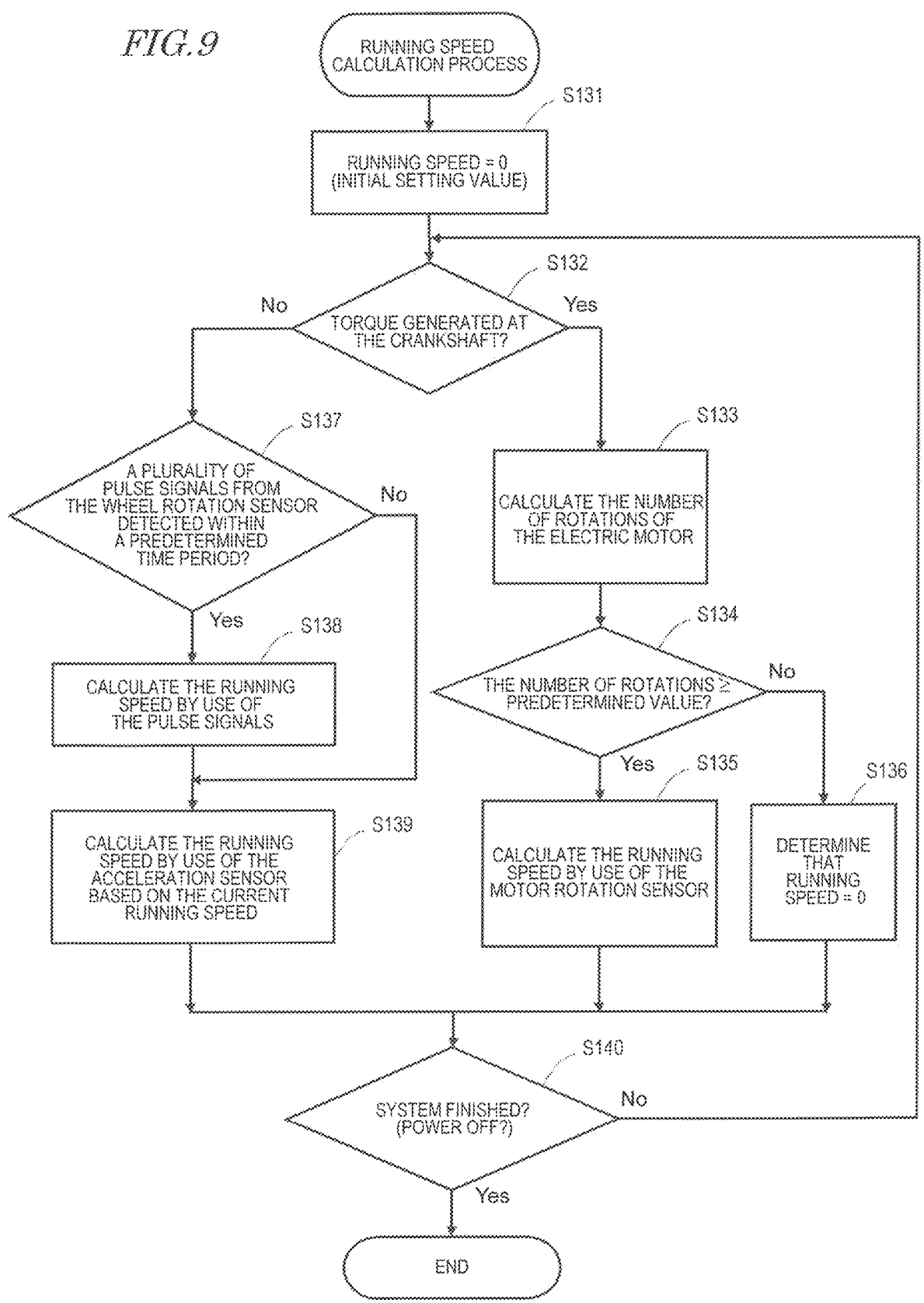

ELECTRIC ASSIST SYSTEM AND ELECTRIC ASSIST VEHICLE

BACKGROUND OF THE INVENTION

1. Field of the Invention

The present invention relates to an electric assist system usable for an electric assist vehicle, and an electric assist vehicle including the electric assist system.

2. Description of the Related Art

An electric assist bicycle, by which power of a rider pedaling the bicycle is assisted by an electric motor, is known. In such an electric assist bicycle, assist power in accordance with human power applied by the rider to a pedal is generated by the electric motor, and a driving force as a sum of the human power and the assist power is transmitted to a driving wheel. The human power may be assisted by the electric motor, so that the power that needs to be provided by the rider to pedal the bicycle is alleviated (e.g., Japanese Laid-Open Patent Publication No. Hei 09-226664).

SUMMARY OF THE INVENTION

An electric assist bicycle may perform a control of changing a magnitude of an assist power to be generated by an electric motor in accordance with a speed of the vehicle. In order to realize this, the electric assist bicycle detects the speed of the vehicle. However, there may be a case where the speed is not detected continually and stably in accordance with a traveling state of the vehicle. For example, immediately after the vehicle starts and immediately before the vehicle stops, it may not be easy to detect the speed of the vehicle continually and stably.

Preferred embodiments of the present invention provide electric assist systems each capable of detecting a speed of a vehicle continually and stably, and electric assist vehicles including such electric assist systems.

An electric assist system according to a preferred embodiment of the present invention is an electric assist system usable for an electric assist vehicle. The electric assist system includes an electric motor that generates assist power assisting human power of a rider of the electric assist vehicle; a rotation sensor that outputs a signal in accordance with a rotation of a rotatable component that rotates to operate the electric assist vehicle; an acceleration sensor that outputs a signal in accordance with an acceleration of the electric assist vehicle in a traveling direction thereof; and a controller that calculates a speed of the electric assist vehicle based on an output signal of the rotation sensor and an output signal of the acceleration sensor.

According to a preferred embodiment of the present invention, the speed of the electric assist vehicle is calculated based on outputs of the rotation sensor and the acceleration sensor together. Under the conditions where it is difficult to detect the speed by using the rotation sensor, the acceleration sensor is used to calculate the speed. Under the conditions where it is difficult to detect the speed by using the acceleration sensor, the rotation sensor is used to calculate the speed. The speed of the vehicle may be detected continually under any of various conditions, and the electric assist vehicle may be controlled in accordance with detected the speed.

In a preferred embodiment of the present invention, the controller may use both of the output signal of the rotation sensor and the output signal of the acceleration sensor to calculate the speed under a first condition, and may use one of the output signal of the rotation sensor and the output signal of the acceleration sensor to calculate the speed under a second condition.

The sensor to be used to calculate the speed may be changed in accordance with the conditions, so that the speed of the vehicle is detected continually under any of various conditions.

In a preferred embodiment of the present invention, the controller may change the sensor to be used to calculate the speed, between the rotation sensor and the acceleration sensor, in accordance with a number of rotations acquired from the output signal of the rotation sensor.

The sensor to be used to calculate the speed may be changed to a sensor suitable to the current number of rotations, so that the speed of the vehicle is detected continually under any of various conditions.

In a preferred embodiment of the present invention, in the case where the number of rotations acquired from the output signal of the rotation sensor is at least a predetermined number of rotations, the controller may use both of the output signal of the rotation sensor and the output signal of the acceleration sensor to calculate the speed of the electric assist vehicle, and in the case where the number of rotations acquired from the output signal of the rotation sensor is lower than the predetermined number of rotations, the controller may use the output signal of the acceleration sensor to calculate the speed of the electric assist vehicle.

In the case where the number of rotations acquired from the rotation sensor is low or zero, for example, immediately after the vehicle starts, immediately before the vehicle stops, or while the electric motor is at a stop, it is difficult to detect the speed by using the rotation sensor. In the case where the number of rotations acquired from the rotation sensor is lower than the predetermined number of rotations, the speed is calculated based on the output of the acceleration sensor. Even under the conditions where it is difficult to detect the speed by using the rotation sensor, the speed may be detected by using the acceleration sensor, so that the electric assist vehicle is controlled in accordance with the detected speed.

In a preferred embodiment of the present invention, in the case where the number of rotations acquired from the output signal of the rotation sensor is at least the predetermined number of rotations, the controller may calculate a first speed based on the output signal of the rotation sensor, calculate a second speed based on the output signal of the acceleration sensor, weight each of the first speed and the second speed, and use both of the weighted first speed and the weighted second speed to calculate the speed of the electric assist vehicle.

The speed acquired from the rotation sensor and the speed acquired from the acceleration sensor may each be weighted. The ratio at which the speed acquired from the sensor suitable to the current number of rotations is adopted may be set to be high, so that the detection precision of the speed is increased.

In a preferred embodiment of the present invention, in the case where the number of rotations acquired from the output signal of the rotation sensor is at least the predetermined number of rotations, the controller may calculate a first speed based on the output signal of the rotation sensor, calculate a second speed based on the output signal of the acceleration sensor, multiply the first speed by a first coefficient and multiply the second speed by a second coefficient, and use both of the first speed multiplied by the first coefficient and the second speed multiplied by the second coefficient to calculate the speed of the electric assist vehicle.

The speed acquired from the rotation sensor and the speed acquired from the acceleration sensor may each be multiplied by a coefficient. The ratio at which the speed acquired from the sensor suitable to the current number of rotations is adopted may be set to be high, so that the detection precision of the speed is increased.

In a preferred embodiment of the present invention, the controller may change the sensor to be used to calculate the speed, between the rotation sensor and the acceleration sensor, in accordance with a speed acquired from the output signal of the rotation sensor.

The sensor to be used to calculate the speed may be changed to a sensor suitable to the current number of rotations, so that the speed of the vehicle is detected continually under any of various conditions.

In a preferred embodiment of the present invention, the rotatable component may be an electric motor, and the rotation sensor may output a signal in accordance with a rotation of the electric motor.

The signal in accordance with the rotation of the electric motor and the output signal of the acceleration sensor may be used together to calculate the speed of the electric assist vehicle. Even under the conditions where the speed cannot be detected by using the rotation sensor, for example, even in a state where the electric motor is at a stop, the speed may be detected by using the acceleration sensor, and the electric assist vehicle may be controlled in accordance with the speed.

In a preferred embodiment of the present invention, the rotatable component may be a wheel of the electric assist vehicle, and the rotation sensor may output a signal in accordance with a rotation of the wheel.

The signal in accordance with the rotation of the wheel and the output signal of the acceleration sensor are used together to calculate the speed of the electric assist vehicle. In the case where the rotation of the wheel is low, for example, immediately after the vehicle starts or immediately before the vehicle stops, it is difficult to detect the speed by using the rotation sensor. Even under the conditions where it is difficult to detect the speed by using the rotation sensor, the speed may be detected by using the acceleration sensor, so that the electric assist vehicle is controlled in accordance with the speed.

In a preferred embodiment of the present invention, the rotation sensor may output a pulse signal each time the wheel rotates by a predetermined angle, the controller may calculate the speed based on two or more of the pulse signals, and in a time period in which no pulse signal is detected, the controller may use the output signal of the acceleration sensor to calculate the speed.

During the time period in which the rotation sensor outputs no pulse signal, the speed cannot be detected based on any pulse signal. During the time period in which the speed cannot be detected by using the rotation sensor, the output signal of the acceleration sensor is used to detect the speed. Accordingly, even during the time period in which the speed cannot be detected by using the rotation sensor, the electric assist vehicle may be controlled in accordance with the speed.

In a preferred embodiment of the present invention, the rotation sensor may output a pulse signal each time the wheel rotates by a predetermined angle, the controller may calculate the speed based on two or more of the pulse signals, and in a time period after the pulse signal is detected but before the next pulse signal is detected, the controller may use the output signal of the acceleration sensor to calculate the speed of the vehicle.

During the time period after the rotation sensor outputs one the pulse signal but before the rotation sensor outputs the next pulse signal, the speed cannot be detected based on any pulse signal. During the time period in which the speed cannot be detected by using the rotation sensor, the acceleration sensor is used to detect the speed. Accordingly, even during the time period in which the speed cannot be detected by using the rotation sensor, the electric assist vehicle may be controlled in accordance with the detected speed.

In a preferred embodiment of the present invention, upon detecting the pulse signal, the controller may calculate the speed based on the detected pulse signal and a pulse signal detected immediately previously, and may correct a magnitude of the speed acquired from the output signal of the acceleration sensor to a magnitude of the speed acquired from the pulse signals.

During the time period in which no pulse signal is detected, the acceleration sensor is used to detect the speed. By contrast, at a time when a pulse signal is detected, using the rotation sensor may provide a higher detection precision of the speed than using the acceleration sensor. In this case, the magnitude of the speed acquired by using the acceleration sensor is corrected to a magnitude of the speed acquired by using the rotation sensor. After such a correction, the speed is detected by using the acceleration sensor during the time period in which no pulse signal is detected. Accordingly, the precision of the speed may be increased.

In a preferred embodiment of the present invention, in a time period after the pulse signal is detected but before the next pulse signal is detected, the controller may calculate the speed based on the output signal of the acceleration sensor based on the speed acquired from the pulse signal.

The speed may be calculated based on the output signal of the acceleration sensor based on the speed detected by using the rotation sensor. Accordingly, the detection precision of the speed by using the acceleration sensor may be increased.

In a preferred embodiment of the present invention, the rotatable component may be the electric motor, the rotation sensor may output a signal in accordance with a rotation of the electric motor, and the controller may calculate a gear ratio of a power transmission mechanism included in the electric assist vehicle based on the output signal of the rotation sensor and the output signal of the acceleration sensor.

In the case where the speed is low, for example, immediately after the vehicle starts or immediately before the vehicle stops, it is difficult to detect the speed by using the rotation sensor. However, the acceleration sensor enables the speed to be detected. The number of rotations of the electric motor may be calculated from the output signal of the rotation sensor. The gear ratio of the power transmission mechanism is calculated from the speed detected by using the acceleration sensor and the number of rotations of the electric motor detected by using the rotation sensor. Accordingly, the electric assist vehicle may be controlled in accordance with the gear ratio.

In a preferred embodiment of the present invention, the electric assist system may further include a rotation sensor that outputs a signal in accordance with a rotation of the electric motor. The controller may calculate a gear ratio of a power transmission mechanism included in the electric assist vehicle based on the signal in accordance with the rotation of the electric motor and the output signal of the acceleration sensor.

In the case where the rotation of the wheel is low, for example, immediately after the vehicle starts or immediately before the vehicle stops, a long time is needed for a signal in accordance with the rotation of the wheel to be output. Accordingly, the speed cannot be calculated, or a long time is required to calculate the speed. Even in such a case, the acceleration sensor enables the speed to be detected. The number of rotations of the electric motor may be calculated from the output signal of the rotation sensor. The gear ratio of the power transmission mechanism may be calculated based on the speed detected by the acceleration sensor and the number of rotations of the electric motor detected by the rotation sensor. Accordingly, the electric assist vehicle may be controlled in accordance with the gear ratio.

An electric assist system according to a preferred embodiment of the present invention is an electric assist system usable for an electric assist vehicle. The electric assist system includes an electric motor that generates assist power assisting human power of a rider of the electric assist vehicle; a rotation sensor that outputs a signal in accordance with a rotation of the electric motor; an acceleration sensor that outputs a signal in accordance with an acceleration of the electric assist vehicle in a traveling direction thereof; and a controller that calculates a gear ratio of a power transmission mechanism included in the electric assist vehicle based on the output signal of the rotation sensor and the output signal of the acceleration sensor.

The speed may be detected by the acceleration sensor, and the number of rotations of the electric motor may be detected by the rotation sensor. The gear ratio of the transmission may be calculated based on the detected speed and the detected number of rotations of the electric motor, and the electric assist vehicle may be controlled in accordance with the gear ratio.

An electric assist vehicle according to a preferred embodiment of the present invention includes the above-described electric assist system. Thus, the electric assist vehicle including the features of the electric assist system described above is provided.

According to a preferred embodiment of the present invention, the rotation sensor outputting a signal in accordance with the rotation of the rotatable component of the electric assist vehicle and the acceleration sensor outputting a signal in accordance with the acceleration of the vehicle in a traveling direction thereof are used together to calculate the speed of the electric assist vehicle. Under the conditions where it is difficult to detect the speed by using the rotation sensor, the acceleration sensor is used to calculate the speed. Under the conditions where it is difficult to detect the speed by using the acceleration sensor, the rotation sensor is used to calculate the speed. The speed of the vehicle may be detected continually and stably under any of various conditions, and the electric assist vehicle may be controlled in accordance with the detected speed.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 9 is a flowchart showing a process of calculating a speed according to a preferred embodiment of the present invention.

DETAILED DESCRIPTION OF THE PREFERRED EMBODIMENTS

Hereinafter, preferred embodiments of electric assist systems and electric assist vehicles according to the present invention will be described with reference to the attached drawings. In the description of the preferred embodiments, like elements will bear like reference signs, and overlapping descriptions will be omitted. In the preferred embodiments of the present invention, the terms "front", "rear", "left", "right", "up" and "down" respectively refer to front, rear, left, right, up and down as seen from a rider, of the electric assist vehicle, sitting on a saddle (seat) while facing a handle. The following preferred embodiments are examples, and the present invention is not limited to any of the following preferred embodiments.

Figure 1:
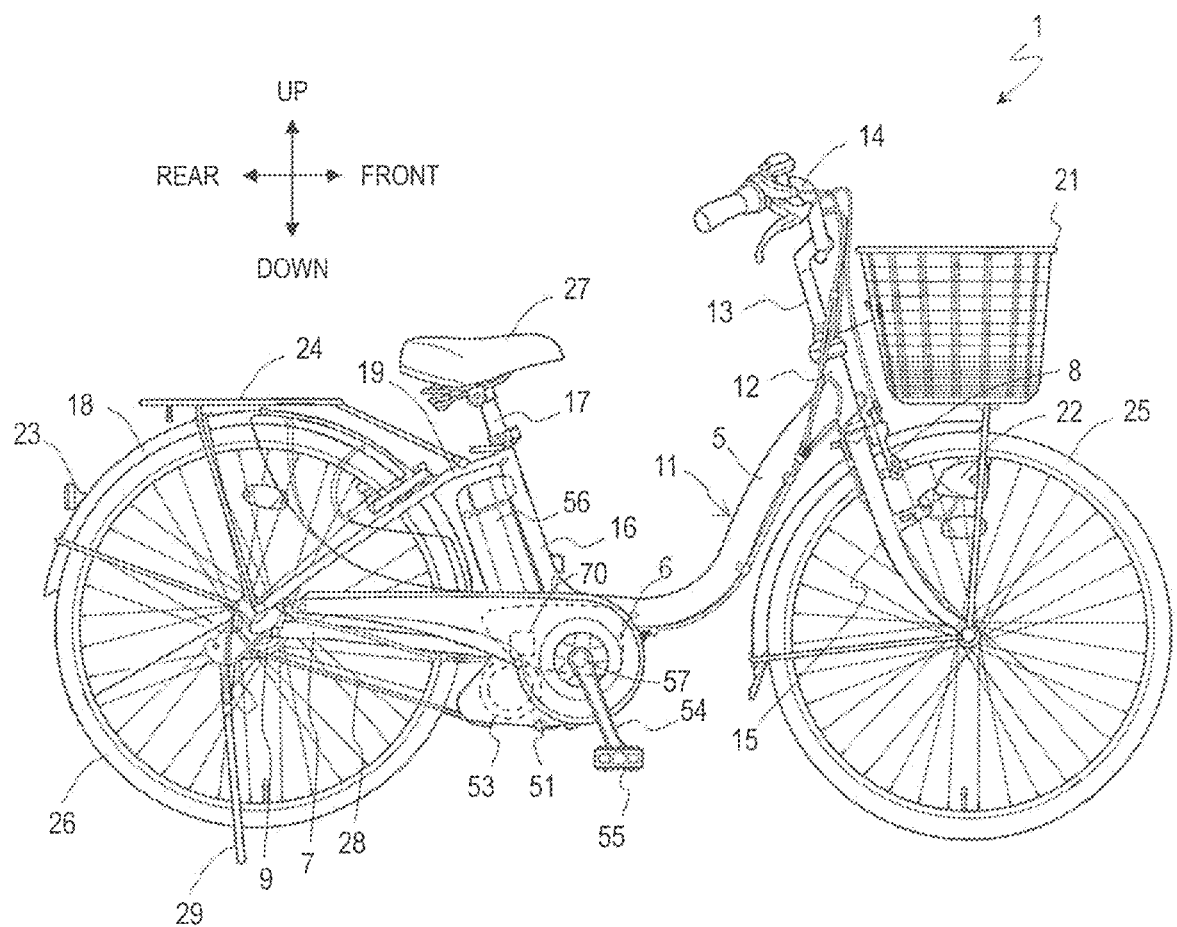
FIG. 1 is a side view showing an electric assist bicycle according to a preferred embodiment of the present invention.

FIG. 1 is a side view showing an electric assist bicycle 1 according to a preferred embodiment of the present invention. The electric assist bicycle 1 includes a driving unit 51 described below. The electric assist bicycle 1 is an example of electric assist vehicle according to a preferred embodiment of the present invention. The driving unit 51 is an example of electric assist system according to a preferred embodiment of the present invention.

The electric assist bicycle 1 includes a vehicle frame 11 extending in a front-rear direction. The vehicle frame 11 includes a head pipe 12, a down tube 5, a bracket 6, chain stays 7, a seat tube 16, and a seat stay 19. The head pipe 12 is located at a front end of the vehicle frame 11. A handle stem 13 is rotatably inserted into the head pipe 12. A handle 14 is secured to a top end of the handle stem 13. A front fork 15 is secured to a bottom end of the handle stem 13. A front wheel 25, which is a steering wheel, is rotatably supported at a bottom end of the front fork 15. The front fork 15 is provided with a brake 8 braking the front wheel 25. A front basket 21 is provided to the front of the head pipe 12. The front fork 15 is provided with a head lamp 22.

The down tube 5 extends obliquely rearward and downward from the head pipe 12. The seat tube 16 extends upward from a rear end of the down tube 5. The chain stays 7 extend rearward from a bottom end of the seat tube 16. The bracket 6 connects the rear end of the down tube 5, the bottom end of the seat tube 16 and front ends of the chain stays 7 to each other.

A seat post 17 is inserted into the seat tube 16, and a saddle 27, on which a rider is to sit, is provided at a top end of the seat post 17. Rear portions of the chain stays 7 support a rear wheel 26, which is a driving wheel, and the rear wheel 26 is rotatable. A brake 9 braking the rear wheel 26 is provided to the rear of the chain stays 7. A stand 29 is provided to the rear of the chain stays 7. While being parked, the electric assist bicycle 1 is held as standing by the stand 29. The seat stay 19 extends obliquely rearward and downward from a top portion of the seat tube 16. A bottom end of the seat stay 19 is connected with the rear portions of the chain stays 7. The seat stay 19 supports a rack 24 provided to the rear of the saddle 27 and also supports a fender 18 covering a top portion of the rear wheel 26. A tail lamp 23 is provided on a rear portion of the fender 18.

The bracket 6, which is located on the vehicle frame 11, at a position adjacent or in a vicinity of the center of the vehicle, is provided with the driving unit 51. The driving unit 51 includes an electric motor 53, a crankshaft 57, and a controller 70. A battery 56 supplying power to the electric motor 53 and the like is mounted on the bracket 6. The battery 56 may be supported by the seat tube 16.

The crankshaft 57 is supported in the state of traveling throughout the driving unit 51 in a left-right direction. Crank arms 54 are provided at both of two ends of the crankshaft 57. A pedal 55 is rotatably provided at a tip of each of the crank arms 54.

The controller 70 controls an operation of the electric assist bicycle 1. The controller 70 typically includes a semiconductor integrated circuit, such as, for example, a microcontroller, a signal processor or the like that is able to process a digital signal. A rotation output of the crankshaft 57 generated when the rider steps on, and rotates, each pedal 55 with his/her foot is transmitted to the rear wheel 26 via a chain 28. The controller 70 controls the electric motor 53 to generate a driving assist output in accordance with the rotation output of the crankshaft 57. The assist power generated by the electric motor 53 is transmitted to the rear wheel 26 via the chain 28. Instead of the chain 28, a belt, a shaft or the like may be used.

Figure 2:
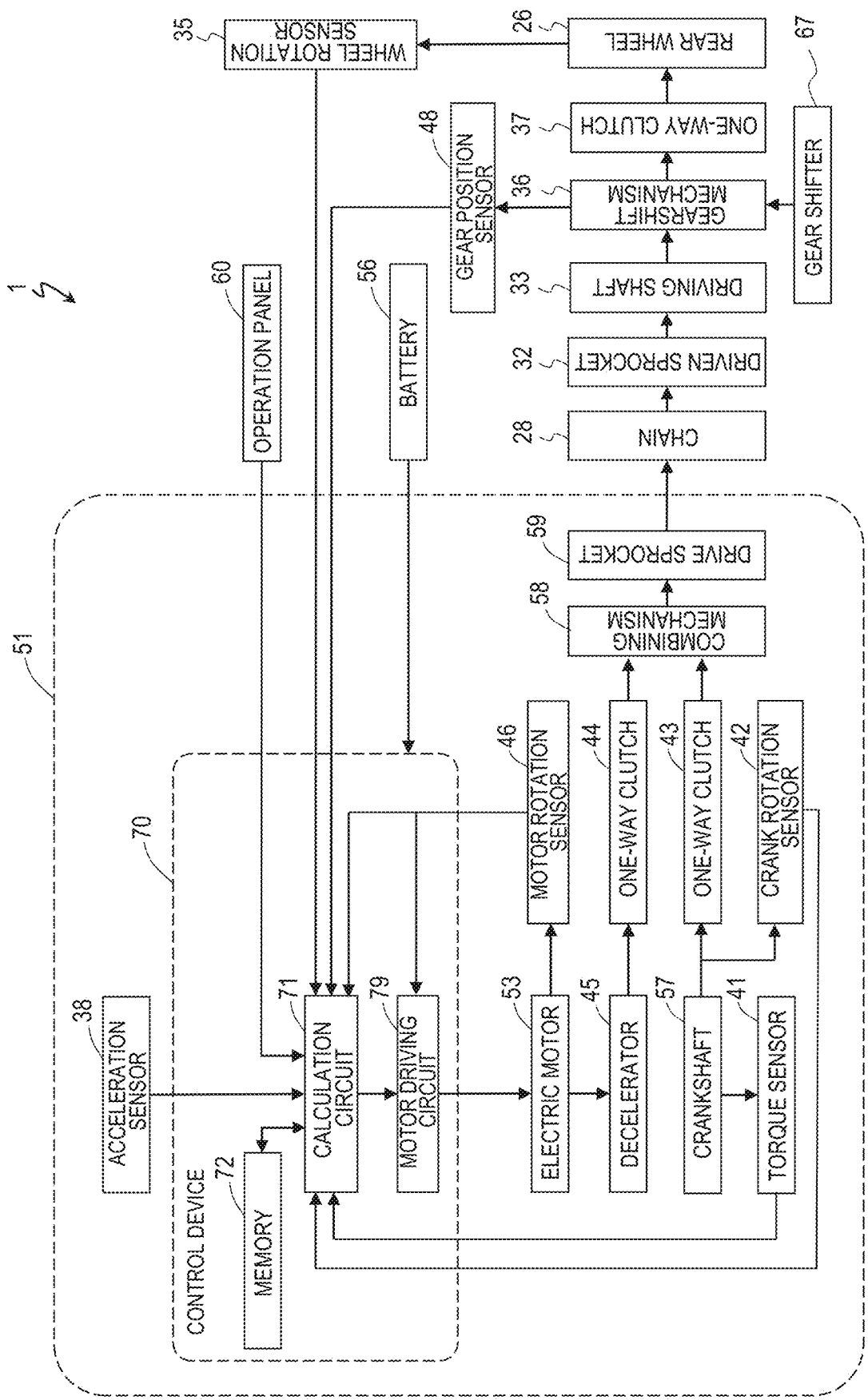
FIG. 2 is a block diagram showing a mechanical structure of an electric assist bicycle according to a preferred embodiment of the present invention.

FIG. 2 is a block diagram showing a mechanical and electrical structure of the electric assist bicycle 1. The driving unit 51 includes an acceleration sensor 38, the controller 70, the electric motor 53, a motor rotation sensor 46, a decelerator 45, a one-way clutch 44, the crankshaft 57, a one-way clutch 43, a torque sensor 41, a crank rotation sensor 42, a combining mechanism 58, and a drive sprocket 59. The driving unit 51 is an assist output control system that causes the electric motor 53 to generate a driving assist output in accordance with the human power of the rider applied to the pedal 55 (FIG. 1).

First, a power transmission route will be described. When the rider steps on the pedal 55 (FIG. 1) to rotate the crankshaft 57, the rotation of the crankshaft 57 is transmitted to the combining mechanism 58 via the one-way clutch 43. The rotation of the electric motor 53 is transmitted to the combining mechanism 58 via the decelerator 45 and the one-way clutch 44.

The combining mechanism 58 includes, for example, a cylindrical member, and the crankshaft 57 is located inside the cylindrical member. The drive sprocket 59 is attached to the combining mechanism 58. The combining mechanism 58 rotates around the same rotation shaft as that of the crankshaft 57 and the drive sprocket 59.

The one-way clutch 43 transmits a forward rotation of the crankshaft 57 to the combining mechanism 58, but does not transmit a reverse rotation of the crankshaft 57 to the combining mechanism 58. A "forward rotation" is a rotation in such a direction to provide a driving force to advance the vehicle. A "reverse rotation" is a rotation in such a direction as not to provide a driving force to advance the vehicle. The one-way clutch 44 transmits, to the combining mechanism 58, a rotation generated by the electric motor 53 in such a direction to cause a forward rotation of the combining mechanism 58, but does not transmit, to the combining mechanism 58, a rotation provided by the electric motor 53 in such a direction to cause a reverse rotation of the combining mechanism 58. In the case where the rider rotates the pedal 55 to rotate the combining mechanism 58 while the electric motor 53 is at a stop, the one-way clutch 44 does not transmit the rotation to the electric motor 53. A pedal force applied by the rider to the pedal 55 and the assist power generated by the electric motor 53 are transmitted to the combining mechanism 58 and combined. The resultant force obtained by the combining mechanism 58 is transmitted to the chain 28 via the drive sprocket 59.

The rotation of the chain 28 is transmitted to a driving shaft 33 via a driven sprocket 32. The rotation of the driving shaft 33 is transmitted to the rear wheel 26 via a gearshift mechanism 36 and a one-way clutch 37.

The gearshift mechanism 36 is a mechanism that changes the gear ratio in accordance with the operation of the rider performed on a gear shifter 67. The gear shifter 67 is attached to, for example, the handle 14 (FIG. 1). In this example, the gearshift mechanism 36 is a built-in transmission. Alternatively, the gearshift mechanism 36 may be an externally mounted transmission. In the case where the gearshift mechanism 36 is an externally mounted transmission, a multi-stage sprocket may be used as the driven sprocket 32. Only in the case where the rotation speed of the output shaft of the gearshift mechanism 36 is higher than the rotation speed of the rear wheel 26, the one-way clutch 37 transmits the rotation of the gearshift mechanism 36 to the rear wheel 26. In the case where the rotation speed of the output shaft of the gearshift mechanism 36 is lower than the rotation speed of the rear wheel 26, the one-way clutch 37 does not transmit the rotation of the gearshift mechanism 36 to the rear wheel 26.

With the above-described power transmission route, the pedal force applied by the rider to the pedal 55 and the assist power generated by the electric motor 53 are transmitted to the rear wheel 26.

The mechanism that combines the pedal force of the rider and the assist power generated by the electric motor 53 is not limited to the combining mechanism 58 rotatable around the same rotation shaft as that of the crankshaft 57 as described above. The pedal force and the assist power may be combined by the chain 28.

Now, a driving control on the electric motor 53 by the controller 70 will be described. The controller 70 is, for example, an MCU (Motor Control Unit). The controller 70 includes a calculation circuit 71, a memory 72, and a motor driving circuit 79. The calculation circuit 71 controls an operation of the electric motor 53, and also controls an operation of each of components of the electric assist bicycle 1. The memory 72 has stored thereon a computer program that defines a procedure of controlling the operation of the electric motor 53 and the operation of each of the components of the electric assist bicycle 1. The calculation circuit 71 reads the computer program from the memory 72 and performs various controls.

The acceleration sensor 38 detects an acceleration of a vehicle main body of the electric assist bicycle 1. The acceleration sensor 38 is, for example, a three-axis acceleration sensor of a piezo resistance type, an electrostatic capacitance type, or a heat sensing type. One such three-axis acceleration sensor is able to measure the acceleration in each of three axial directions perpendicular to each other (X-axis, Y-axis and Z-axis directions).

In this specification, the three axial directions perpendicular to each other (X-axis, Y-axis and Z-axis directions) do not represent an absolute coordinate system but represent a relative coordinate system. More specifically, the three axial directions perpendicular to each other (X-axis, Y-axis and Z-axis directions) are respectively the front-rear direction, the left-right direction and an up-down direction of the electric assist bicycle 1 including the acceleration sensor 38. The forward direction of the electric assist bicycle 1 matches a traveling direction thereof, and the up-down direction of the electric assist bicycle 1 matches a direction perpendicular or substantially perpendicular to a road surface. Therefore, the X axis, the Y axis and the Z axis of the electric assist bicycle 1 traveling on a flat road may not match the X axis, the Y axis and the Z axis of the electric assist bicycle 1 traveling on a slope.

To enable the acceleration sensor 38 to measure acceleration values in the front-rear direction, the left-right direction and the up-down direction of the electric assist bicycle 1, various methods are conceivable. For example, the acceleration sensor 38 may be attached to the driving unit 51, and the X axis, the Y axis and the Z axis of the acceleration sensor 38 respectively match the front-rear direction, the left-right direction, and the up-down direction of the vehicle. The acceleration sensor 38, when attached as described above, is provided on a horizontal surface.

The acceleration sensor 38 is provided on an electronic circuit board (not shown). Also provided on the electronic circuit board may be a power source that transmits power from a battery 56 to each of electronic components of the electric assist bicycle 1 and controller elements including various IC chips, for example, the motor driving circuit 79, the calculation circuit 71, the memory 72 and the like.

The above-described electronic circuit board may be located vertically in the driving unit 51 to provide size restriction or the like. In this case, the acceleration sensor 38 is not provided on the horizontal surface. Therefore, the acceleration value that is output from the acceleration sensor 38 is smaller than the acceleration value that is to be output in the case where the acceleration sensor 38 is provided on the horizontal surface, by a magnitude corresponding to the angle at which the acceleration sensor 38 is attached to the driving unit 51. In other words, a detection direction correction is performed. A specific processing content of the detection direction correction is known, and will not be described in detail in this specification. The output values of the acceleration sensor 38 may be corrected in advance, so that the output values of the acceleration sensor 38 regarding the X axis, the Y axis and the Z axis are measured as the acceleration values of the electric assist bicycle 1 in the front-rear direction, the left-right direction and the up-down direction.

It is preferred that the acceleration sensor 38 is located at a position close to the center of gravity of the electric assist bicycle 1. As understood from FIG. 1, the driving unit 51 is located close to the pedals 55. Therefore, the acceleration sensor 38 is considered to be located close to the center of gravity of the electric assist bicycle 1.

In order to prevent the acceleration sensor 38 from being restricted by the direction in which the electronic circuit board is installed, it is conceivable to provide the acceleration sensor 38 separately from the electronic circuit board. In the case where the acceleration sensor 38 and the electronic circuit board are separate from each other, the acceleration sensor 38 may be located, with higher precision, closer to the center of gravity of the electric assist bicycle 1 in a still state.

The three-axis acceleration sensor is an example of the acceleration sensor 38. A two-axis acceleration sensor capable of measuring an acceleration Gx in the X-axis direction and an acceleration Gz in the Z-axis direction may be included as the acceleration sensor 38. A monoaxial acceleration sensor capable of measuring the acceleration Gx in the X-axis direction may be included as the acceleration sensor 38. The acceleration sensor 38 is preferably able to measure at least the acceleration Gx in the X-axis direction along the traveling direction of the vehicle. A plurality of acceleration sensors may be used to detect accelerations in different axial directions respectively. In the example shown in FIG. 2, the acceleration sensor 38 is located in the driving unit 51. The position of the acceleration sensor 38 is not limited to this, and the acceleration sensor 38 may be located at any position in the electric assist bicycle 1.

The calculation circuit 71 calculates, for example, an acceleration of the vehicle in a traveling direction thereof from a detection signal that is output from the acceleration sensor 38. The calculation circuit 71 may integrate the acceleration of the vehicle in the traveling direction thereof to acquire a speed of the vehicle.

The torque sensor 41 detects the human power (pedal force) applied by the rider to the pedal 55, as a torque generated at the crankshaft 57. The torque sensor 41 is, for example, a magnetostrictive torque sensor. The torque sensor 41 outputs, to the calculation circuit 71, a voltage signal having an amplitude in accordance with the magnitude of the detected torque. The calculation circuit 71 converts the voltage signal from the torque sensor 41 into a torque value. For example, the calculation circuit 71 converts an analog voltage signal that is input from the torque signal into a digital value, and calculates the torque from the magnitude of the digital value.

The torque sensor 41 may include a torque calculation circuit (not shown) that converts a voltage signal into a torque value. For example, the torque calculation circuit converts an output analog voltage signal into a digital voltage signal. The magnitude of the detected torque is output as a magnitude of the digital voltage signal. The torque sensor 41 may output an analog signal or a digital signal.

The crank rotation sensor 42 detects a rotation angle of the crankshaft 57. The crank rotation sensor 42 outputs, to the calculation circuit 71, a signal in accordance with the rotation angle of the crankshaft 57. For example, the crank rotation sensor 42 detects the rotation of the crankshaft 57 at every predetermined angle, and outputs a rectangular wave signal or a sine wave signal. The output signal may be used to calculate a rotation angle and a rotation speed of the crankshaft 57. For example, a plurality of magnetic bodies including magnetic poles (N pole, S pole) are located around the crankshaft 57. A Hall sensor located at a fixed position converts a change in the magnetic field polarity caused by the rotation of the crankshaft 57 into a voltage signal. The calculation circuit 71 uses the signal that is output from the Hall sensor to count changes in the magnetic field polarity to calculate the rotation angle and the rotation speed of the crankshaft 57. The crank rotation sensor 42 may include a calculation circuit that calculates the rotation angle and the rotation speed of the crankshaft 57 from the acquired signal. The calculation circuit 71 multiplies the torque of the crankshaft 57 by the rotation speed of the crankshaft 57 to calculate a crank rotation output.

The electric motor 53 is provided with a motor rotation sensor 46. The motor rotation sensor 46 is, for example, an encoder. The motor rotation sensor 46 detects a rotation angle of the electric motor 53, and outputs a signal in accordance with the rotation angle to the calculation circuit 71 and the motor driving circuit 79. For example, the motor rotation sensor 46 detects a rotation of a rotor at every predetermined angle, and outputs a rectangular wave signal or a sine wave signal. The calculation circuit 71 and the motor driving circuit 79 calculate the number of rotations and a rotation speed of the electric motor 53 from an output signal of the motor rotation sensor 46.

A wheel rotation sensor 35, for example, detects a rotation angle of the rear wheel 26, and outputs a signal in accordance with the rotation angle to the calculation circuit 71. For example, the wheel rotation sensor 35 detects a rotation of the rear wheel 26 at every predetermined angle, and outputs a rectangular wave signal or a sine wave signal. The calculation circuit 71 calculates the number of rotations and a rotation speed of the rear wheel 26 from an output signal of the wheel rotation sensor 35.

Figure 3:
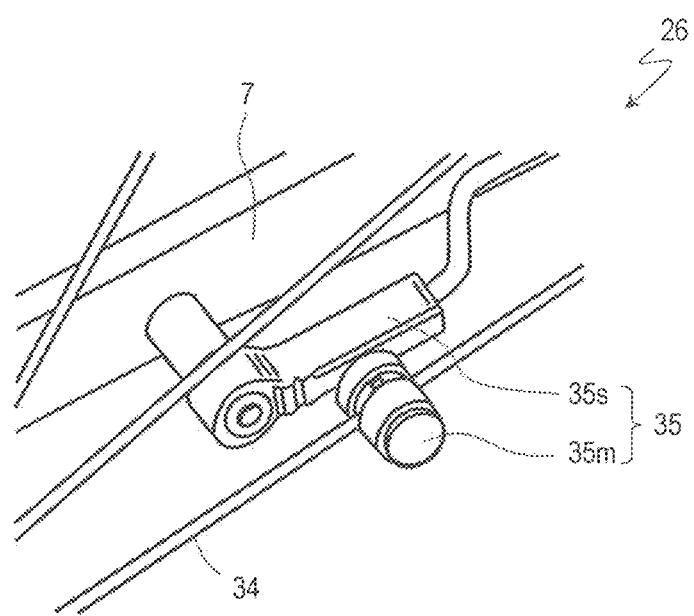
FIG. 3 is a perspective view showing a rotation sensor included in an electric assist bicycle according to a preferred embodiment of the present invention.

FIG. 3 is a perspective view showing an example of the wheel rotation sensor 35. In this example, the wheel rotation sensor 35 includes a Hall sensor 35s and a permanent magnet 35m. The Hall sensor 35s is provided on, for example, one of the pair of chain stays 7 (FIG. 1) supporting the rear wheel 26. The permanent magnet 35m is provided on, for example, a spoke 34 of the rear wheel 26. One or more permanent magnets 35m may be provided on the rear wheel 26. In this example, one permanent magnet 35m is provided on the rear wheel 26. Each time the rear wheel 26 rotates once, the permanent magnet 35m passes the vicinity of the Hall sensor 35s once. When the permanent magnet 35m approaches the Hall sensor 35s, the Hall sensor 35s detects the magnetism generated by the permanent magnet 35m, and outputs a pulse signal. Each time the permanent magnet 35m passes the vicinity of the Hall sensor 35s, the Hall sensor 35s outputs one pulse signal. Namely, in this example, each time the rear wheel 26 rotates once, the Hall sensor 35s outputs one pulse signal. The calculation circuit 71 uses the output signal of the Hall sensor 35s to calculate the number of rotations and the rotation speed of the rear wheel 26.

The wheel rotation sensor 35 may detect a rotation of the front wheel 25. In this case, for example, the Hall sensor 35s is provided on the front fork 15 (FIG. 1), and the permanent magnet 35m is provided on a spoke of the front wheel 25. The calculation circuit 71 uses the output signal of the Hall sensor 35s to calculate the number of rotations and a rotation speed of the front wheel 25.

A gear position sensor 48 outputs data representing a gear position of the gearshift mechanism 36 to the calculation circuit 71. The calculation circuit 71 calculates a gear ratio of a power transmission mechanism between the crankshaft 57 and the rear wheel 26, from the data representing the gear position. As described below, the calculation circuit 71 may calculate the gear ratio from the rotation speed of the electric motor 53 and the speed of the vehicle main body. In this case, the gear position sensor 48 may be omitted.

The calculation circuit 71 calculates a command value that causes generation of an appropriate driving assist output from the torque and the rotation speed of the crankshaft 57, the speed of the vehicle, the gear ratio, the switch operation performed by the rider on an operation device 80, information stored on the memory 72 and the like, and transmits the command value to the motor driving circuit 79. The calculation circuit 71 calculates the command value by, for example, referring to a map created based on, for example, the relationship between the crank rotation output generated by the human power of the rider applied to the pedal 55 and the driving assist output generated by the electric motor 53. The memory 72 has a plurality of types of maps stored thereon. The calculation circuit 71 reads a map matching the conditions from the memory 72 and refers to the read map to calculate the command value.

The motor driving circuit 79 is, for example, an inverter. The motor driving circuit 79 supplies, from the battery 56 to the electric motor 53, an electric current having an amplitude, a frequency, a flow direction and the like in accordance with the command value from the calculation circuit 71. The electric motor 53 supplied with the electric current rotates to generate a predetermined driving assist output. Accordingly, the calculation circuit 71 causes the electric motor 53 to generate assist power, and the operation of the rider of rotating the pedals 55 during the traveling is assisted.

The magnitude of the assist power to be generated by the electric motor 53 may change in accordance with an assist mode currently selected. The assist mode may be selected by the rider operating an operation panel 60.

The operation panel 60 preferably is attached to the handle 14 (FIG. 1) of the electric assist bicycle 1, and is electrically connected with the controller 70 by, for example, a wire cable. The operation panel 60 transmits an operation signal, representing the operation performed by the rider, to the controller 70, and receives various information to be presented to the rider from the controller 70.

Figure 4:
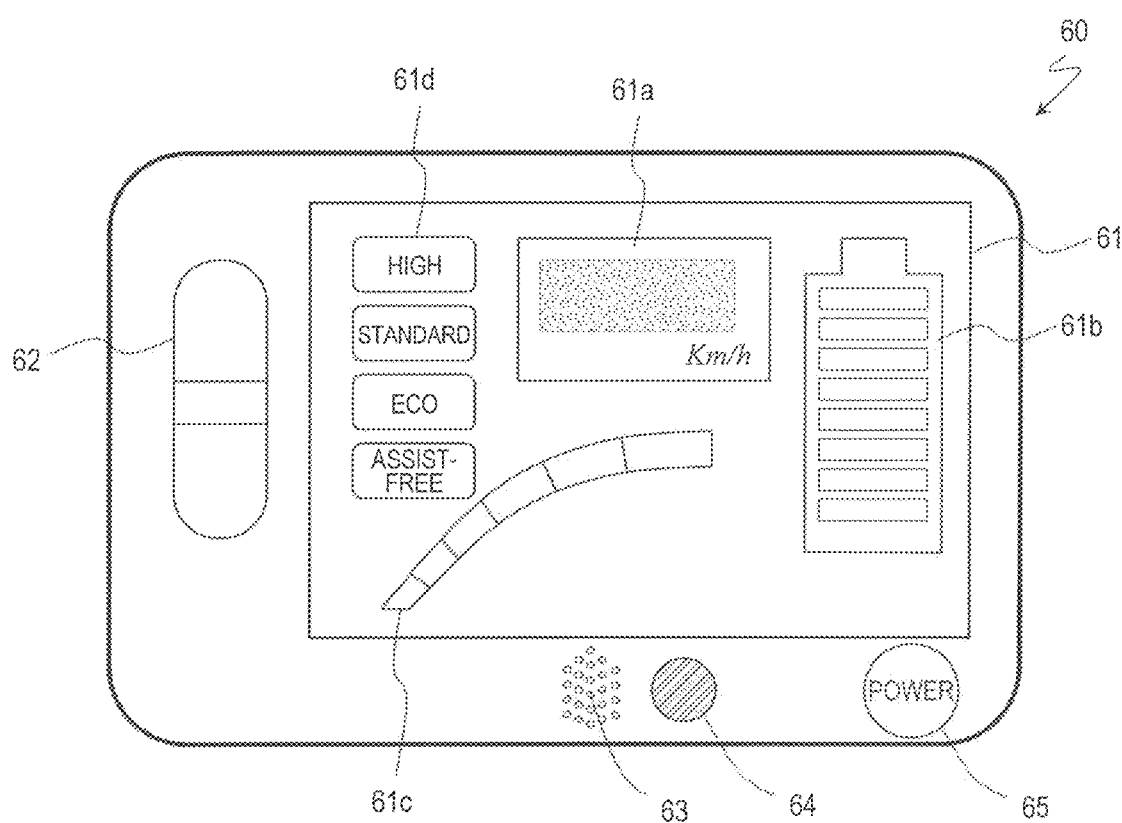
FIG. 4 is an external view of an operation panel according to a preferred embodiment of the present invention.

FIG. 4 is an external view of the operation panel 60. The operation panel 60 is attached to, for example, the handle 14, at a position close to a left grip thereof.

The operation panel 60 includes a display panel 61, an assist mode operation switch 62, and a power switch 65.

The display panel 61 is, for example, a liquid crystal panel. The display panel 61 displays information provided by the controller 70 that includes the speed of the electric assist bicycle 1, the remaining capacitance of the battery 56, information on the range in which the assist ratio is to be changed, the assist mode, and other information on the vehicle movement.

The display panel 61 includes a speed display area 61a, a battery remaining capacitance display area 61b, an assist ratio change range display area 61c, and an assist mode display area 61d. The display panel 61 acts as a notification device that notifies the rider of such information and the like. In this example, the information is displayed. Alternatively, an audio signal may be output to notify the rider of the information.

The speed display area 61a displays the vehicle speed of the electric assist bicycle 1 by numerical figures. In this preferred embodiment of the present invention, the vehicle speed of the electric assist bicycle 1 is detected by the wheel rotation sensor 35 provided on the rear wheel 26 or the front wheel 25.

The battery remaining capacitance display area 61b displays the remaining capacitance of the battery 56 by segments based on information on the battery remaining capacitance that is output from the battery 56 to the controller 70. With such display, the rider may intuitively grasp the remaining capacitance of the battery 56.

The assist ratio change range display area 61c displays the range, set by the controller 70, in which the assist ratio is to be changed. The range is displayed by segments. The assist ratio, within the change ratio, that is currently used may also be displayed.

The assist mode display area 61d displays the assist mode selected by the rider operating the assist mode operation switch 62. The assist mode is, for example, "high", "standard" or "AUTO-ECO". In the case where the rider operates the assist mode operation switch 62 to select "assist mode off", the assist mode display area 61d displays "assist-free".

The assist mode selection switch 62 enables the rider to select one of the plurality of assist modes (including "assist mode off") described above. When one of the plurality of assist modes is selected, a microcontroller (not shown) provided inside the operation panel 60 transmits an operation signal, specifying the selected assist mode, to the controller 70.

The power switch 65 is a switch by which the power source of the electric assist bicycle 1 is switched on or off. The rider presses the power switch 65 to switch the power source of the electric assist bicycle 1 on or off.

The operation panel 60 further includes a speaker 63 providing information to the rider by an audio signal and a lamp 64 providing information to the rider by light. For example, the controller 70 changes the magnitude of the assist power to be generated by the electric motor 53 in accordance with the change in the acceleration, which is associated with the operation of the rider rotating the pedals 55. At this point, it is notified to the rider by, for example, the output of an audio signal and/or blinking of light, that the magnitude of the assist power has been changed. As a result of the notification, the rider may recognize that, for example, large assist power has been generated. Alternatively, the handle 14 and/or the saddle 27 may be vibrated to notify the rider that the magnitude of the assist power has been changed.

While the assist power is large, the speaker 63 may be caused to generate an audio signal of a volume that is heard by people around the electric assist bicycle 1, or the head lamp 22 and the tail lamp 23 may be lit up or blinked. Accordingly, the people around the electric assist bicycle 1 recognize that the electric assist bicycle 1 is generating assist power larger than the usual assist power.

The assist power of the electric motor 53 is largest in the "high" mode, is smallest in the "AUTO-ECO" mode, and is middle in the "standard" mode in response to the crank rotation output.

In the case where the assist mode is "standard", the electric motor 53 generates assist power when, for example, the electric assist bicycle 1 is to start, is traveling on a flat road, or is traveling on an ascending slope. In the case where the assist mode is "high", the electric motor 53 generates assist power when, for example, the electric assist bicycle 1 is to start, is traveling on a flat road, or is traveling on an ascending slope, like in the case where the assist mode is "standard". In the case where the assist mode is "high", the electric motor 53 generates larger assist power than in the case where the assist mode is "standard" in response to the same crank rotation output. In the case where the assist mode is "AUTO-ECO", when the pedal force is small because the electric assist bicycle 1 is, for example, traveling on a flat road or on a descending slope, the electric motor 53 decreases the assist power as compared with in the case where the assist mode is "standard" or stops the generation of the assist power to reduce the power consumption. In the case where the assist mode is "assist-free mode", the electric motor 53 does not generate any assist power.

As described above, the assist power in response to the crank rotation output is varied in accordance with the assist mode described above. In this example, the assist mode is switched to any one of four stages. Alternatively, the assist mode may be switched to any one of three stages or less, or any one of five stages or more.

Now, an example process, according to this preferred embodiment of the present invention, of calculating the speed of the electric assist bicycle 1 based on an output signal of the rotation sensor and an output signal of an acceleration sensor will be described.

As described above, the electric assist bicycle 1 performs a control of changing the magnitude of the assist power to be generated by the electric motor 53 in accordance with the speed of the vehicle. In order to realize this, the calculation circuit 71 calculates the speed based on, for example, the output signal of the wheel rotation sensor 35. However, with the method of calculating the speed based on the output signal of the wheel rotation sensor 35, it may not be easy to calculate the speed continually and stably in the case where the vehicle is traveling in a certain state, for example, immediately after the vehicle starts or immediately before the vehicle stops.

In this preferred embodiment of the present invention, the speed of the electric assist bicycle 1 is calculated based on the output signal of the rotation sensor that outputs a signal in accordance with a rotation of a rotatable component of the electric assist bicycle 1 and also based on the output signal of the acceleration sensor 38.

The "rotatable component" is a component that rotates in order to operate the electric assist bicycle 1. The rotatable component is, for example, the electric motor 53, the rear wheel 26 or the front wheel 25. The rotatable component may be any component provided in the power transmission route between the electric motor 53 and the rear wheel 26. The rotatable component may be, for example, a gear in the decelerator 45 or a gear in the gearshift mechanism 36. The "calculation using the output signal of the rotation sensor and the output signal of the acceleration sensor 38" refers to, for example, a process including, in a mixed state, a calculation using the output signals from both of the rotation sensor and the acceleration sensor 38 and a calculation using the output signal of one of the rotation sensor and the acceleration sensor 38.

In this preferred embodiment of the present invention, the speed of the electric assist bicycle 1 is calculated by using, for example, the wheel rotation sensor 35 and the acceleration sensor 38 together. Under the conditions where it is difficult to detect the speed by using the wheel rotation sensor 35, the acceleration sensor 38 is used to calculate the speed. Under the conditions where it is difficult to detect the speed by using the acceleration sensor 38, the wheel rotation sensor 35 is used to calculate the speed. Alternatively, the speed of the electric assist bicycle 1 is calculated by using, for example, both the motor rotation sensor 46 and the acceleration sensor 38 together. Under the conditions where it is difficult to detect the speed by using the motor rotation sensor 46, the acceleration sensor 38 is used to calculate the speed. Under the conditions where it is difficult to detect the speed by using the acceleration sensor 38, the motor rotation sensor 46 is used to calculate the speed. Accordingly, the speed of the vehicle is able to be detected continually under any of various conditions, and the electric assist bicycle 1 is able to be appropriately controlled in accordance with the detected speed.

Figure 5:
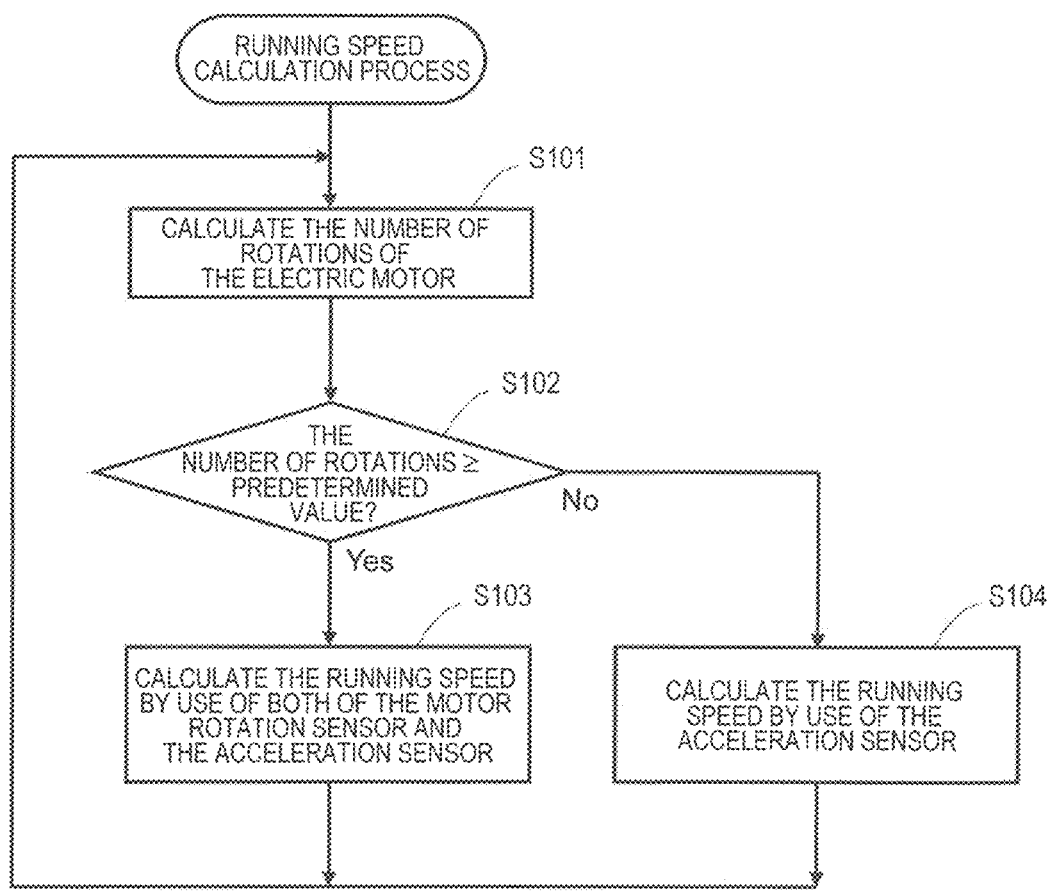
FIG. 5 is a flowchart showing a process of calculating a speed according to a preferred embodiment of the present invention.

FIG. 5 is a flowchart showing an example of process of calculating the speed. In the example shown in FIG. 5, the motor rotation sensor 46 and the acceleration sensor 38 are used together to calculate the speed of the electric assist bicycle 1.

The relationship between the number of rotations of the electric motor 53 and the speed of the electric assist bicycle 1 may be represented by, for example, expression 1 below.

$$V_1 = 60 \times R_{53} \times r_{45} \times r_{36} \times c_{26} \qquad \text{(expression 1)}$$

In the expression 1, $V_1$ is the speed (km/h) of the vehicle, $R_{53}$ is the number of rotations (rpm) of the electric motor 53, $r_{45}$ is the deceleration ratio of the decelerator 45, $r_{36}$ is the gear ratio between an output shaft of the decelerator 45 and the rear wheel 26, and $C_{26}$ is the outer circumferential length of the rear wheel 26.

The calculation circuit 71 may calculate the number of rotations $R_{53}$ of the electric motor 53 from the output signal of the motor rotation sensor 46. The deceleration ratio $r_{45}$ of the decelerator 45 and the outer circumferential length $C_{26}$ of the rear wheel 26 are fixed values, and the calculation circuit 71 stores these fixed values in advance.

The calculation circuit 71 may use a signal, representing the gear position of the gearshift mechanism 36, that is output from the gear position sensor 48 to calculate the gear ratio $r_{36}$. For example, it is assumed that the number of teeth or the like of each of the components, except for the gearshift mechanism 36, that are located between the output shaft of the decelerator 45 and the rear wheel 26 is a fixed value. Namely, the deceleration ratio or the acceleration ratio of the power transmission mechanism, except for the gearshift mechanism 36, between the output shaft of the decelerator 45 and the rear wheel 26 is a fixed value, and the calculation circuit 71 stores such a fixed value in advance. The calculation circuit 71 also stores the deceleration ratio or the acceleration ratio at each of a plurality of gear positions of the gearshift mechanism 36 in advance. The calculation circuit 71 may calculate the gear ratio $r_{36}$ by using the above-mentioned fixed values and the output signal of the gear position sensor 48. The calculation circuit 71 may store, in advance, a table representing the relationship between the gear position of the gearshift mechanism 36, the number of rotations of the electric motor 53 and the speed of the electric assist bicycle 1. In this case, the calculation circuit 71 may calculate the speed by referring to the table.

As described above, the speed of the electric assist bicycle 1 may be calculated from the number of rotations of the electric motor 53. Therefore, even in a preferred embodiment of the present invention in which, for example, the electric assist bicycle 1 does not include the wheel rotation sensor 35, the calculation circuit 71 may acquire the speed of the electric assist bicycle 1. Even in a preferred embodiment of the present invention in which, for example, the wheel rotation sensor 35 malfunctions, the calculation circuit 71 may acquire the speed of the electric assist bicycle 1.

However, in the case where the number of rotations acquired from the motor rotation sensor 46 is low or zero, for example, immediately after the vehicle starts, immediately before the vehicle stops, or while the electric motor 53 is at a stop, it is difficult or impossible to detect the speed by the motor rotation sensor 46. Therefore, in this preferred embodiment of the present invention, in the case where the number of rotations acquired from the motor rotation sensor 46 is lower than a predetermined number of rotations, the calculation circuit 71 calculates the speed by using the acceleration sensor 38. The calculation circuit 71 may acquire the speed of the vehicle by integrating the acceleration, of the vehicle in a traveling direction thereof, that is acquired from the output signal of the acceleration sensor 38. Also under the conditions where it is difficult to detect the speed by using the motor rotation sensor 46, the speed may be detected by using the acceleration sensor 38, so that the electric assist bicycle 1 is controlled in accordance with the speed.

In step S101 shown in FIG. 5, the calculation circuit 71 calculates the number of rotations of the electric motor 53 based on the output signal of the motor rotation sensor 46. Next, in step S102, the calculation circuit 71 determines whether or not the number of rotations acquired from the output signal of the motor rotation sensor 46 is at least a predetermined number of rotations.

The "predetermined number of rotations" is, for example, the number of rotations of the electric motor 53 while the electric assist bicycle 1 is traveling slowly. The predetermined number of rotations is, for example, the number of rotations of the electric motor 53 corresponding to the speed of the vehicle of 2 km/h. In an example, where the speed $V_1 = 2$ (km/h), the deceleration ratio $r_{45} = 1/40$, the gear ratio $r_{36} = 38/25$ and the outer circumferential length $C_{26} = 2$ (m), the number of rotations $R_{53}$ of the electric motor 53 is 439 (rpm) from expression 1 above. Namely, in this example, the predetermined number of rotations is 439 (rpm). This value of the number of rotations is merely an example, and does not limit the present invention.

In the case of determining, in step S102, that the number of rotations acquired from the output signal of the motor rotation sensor 46 is at least the predetermined number of rotations, the calculation circuit 71 advances the process to step S103. In step S103, the calculation circuit 71 uses both of the output signal of the motor rotation sensor 46 and the output signal of the acceleration sensor 38 to calculate the speed of the vehicle.

For example, the calculation circuit 71 weights each of the speed calculated from the output signal of the motor rotation sensor 46 and the speed calculated from the output signal of the acceleration sensor 38. The calculation circuit 71 uses the two weighted speeds to calculate the speed of the vehicle. For example, the calculation circuit 71 calculates the speed $V_1$ of the vehicle as represented by expression 2 below.

$$V_1 = a \times V_m + (1-a) \times V_g \qquad \text{(expression 2)}$$

In the expression 2, $V_m$ is the speed calculated from the output signal of the motor rotation sensor 46, $V_g$ is the speed calculated from the output signal of the acceleration sensor 38, and "a" is an arbitrary value that fulfills 0<a<1. The calculated speeds $V_m$ and $V_g$ are each multiplied by a coefficient. The value of the coefficient is adjusted, and the ratio at which the speed acquired from the sensor suitable to the current number of rotations of the electric motor 53 is adopted is high. Thus, the detection precision of the speed may be increased.

The value of "a" may be fixed or variable. In the case where, for example, the number of rotations of the electric motor 53 is high, the precision of the speed calculated from the number of rotations of the electric motor 53 is higher than the precision of the speed calculated from the output signal of the acceleration sensor 38. Therefore, in the case where the number of rotations of the electric motor 53 is high, the value of "a" is increased, so that the ratio at which the speed acquired from the output signal of the motor rotation sensor 46 is adopted is high. By contrast, in the case where the number of rotations of the electric motor 53 is low, the precision of the speed calculated from the number of rotations of the electric motor 53 is lower. Therefore, in the case where the number of rotations of the electric motor 53 is low, the value of "a" is decreased, so that the ratio at which the speed acquired from the output signal of the acceleration sensor 38 is adopted is high. Accordingly, the detection precision of the speed may be increased.

In the case of determining, in step S102, that the number of rotations acquired from the output signal of the motor rotation sensor 46 is lower than the predetermined number of rotations, the calculation circuit 71 advances the process to step S104. In step S104, the calculation circuit 71 uses the output signal of the acceleration sensor 38 to calculate the speed of the vehicle. In step S104, the calculation circuit 71 does not use the output signal of the motor rotation sensor 46 to calculate the speed of the vehicle.

While the rider is performing inertia drive without rotating the pedals 55 of the electric assist bicycle 1 or is traveling on a descending slope without rotating the pedals 55, the electric motor 53 is at a stop. The number of rotations of the electric motor 53 at this point is zero. In this case, the speed acquired from the number of rotations of the electric motor 53 is zero, which is different from the actual speed of the vehicle.

Under the conditions where the one-way clutch 37 (FIG. 2) does not transmit the rotation of the electric motor 53 to the rear wheel 26, the speed acquired from the number of rotations of the electric motor 53 may be of a value different from that of the actual speed of the vehicle. For example, in the case where the rider slightly moves the pedals 55 while performing inertial drive or traveling on a descending slope, the electric motor 53 may be rotated slightly. However, in the case where the number of rotations of the output shaft of the gearshift mechanism 36 is lower than the number of rotations of the rear wheel 26, the one-way clutch 37 does not transmit the rotation of the electric motor 53 to the rear wheel 26. Under such conditions, the speed acquired from the number of rotations of the electric motor 53 may be of a value different from that of the actual speed of the vehicle.

Therefore, in step S104, the calculation circuit 71 does not use the output signal of the motor rotation sensor 46 but uses the output signal of the acceleration sensor 38 to calculate the speed of the vehicle. The calculation circuit 71 may integrate the acceleration, of the vehicle in the traveling direction thereof, that is acquired from the output signal of the acceleration sensor 38 to acquire the speed of the vehicle.

In the case where the vibration of the vehicle is large or in the case where the vehicle is traveling on a slope, it is difficult to calculate the speed of the vehicle from the output signal of the acceleration sensor 38. In this case, the calculation circuit 71 may use the output signal of the motor rotation sensor 46, without using the output signal of the acceleration sensor 38, to calculate the speed of the vehicle. Alternatively, the calculation circuit 71 may increase the value of "a" in expression 2 presented above to calculate the speed of the vehicle.

As described above, the output signal of the motor rotation sensor 46 and the output signal of the acceleration sensor 38 may be used for different cases, so that the speed of the vehicle is detected continually and stably under any of various conditions. Therefore, the electric assist bicycle 1 may be appropriately controlled in accordance with the speed under any of various conditions.

In the above-described example, the calculation circuit 71 changes the sensor to be used to calculate the speed, between the motor rotation sensor 46 and the acceleration sensor 38, in accordance with the number of rotations acquired from the output signal of the motor rotation sensor 46. Alternatively, the calculation circuit 71 may change the sensor to be used to calculate the speed, between the motor rotation sensor 46 and the acceleration sensor 38, in accordance with the number of rotations of the electric motor 53 or the number of rotations of a rotatable component in the vicinity thereof, the number of rotations being acquired from the output signal of the motor rotation sensor 46. The "change of the sensor to be used to calculate the speed" is not limited to switching the calculation between the calculation using one of the motor rotation sensor 46 and the acceleration sensor 38 and the calculation using both of the motor rotation sensor 46 and the acceleration sensor 38. The "change of the sensor" encompasses switching the calculation between the calculation using one of the motor rotation sensor 46 and the acceleration sensor 38 and the calculation using the other of the motor rotation sensor 46 and the acceleration sensor 38.

In the above-described example, the unit of the speed is km/h and the unit of the number of rotations is rpm. Any other unit may be used for the calculations. For example, the unit of the speed may be meters/min, and the unit of the number of rotations may be rps.

Now, a process of calculating the speed of the electric assist bicycle 1 by using the wheel rotation sensor 35 (FIG. 2), detecting the rotation of the rear wheel 26, and the acceleration sensor 38 together will be described.

Figure 6:
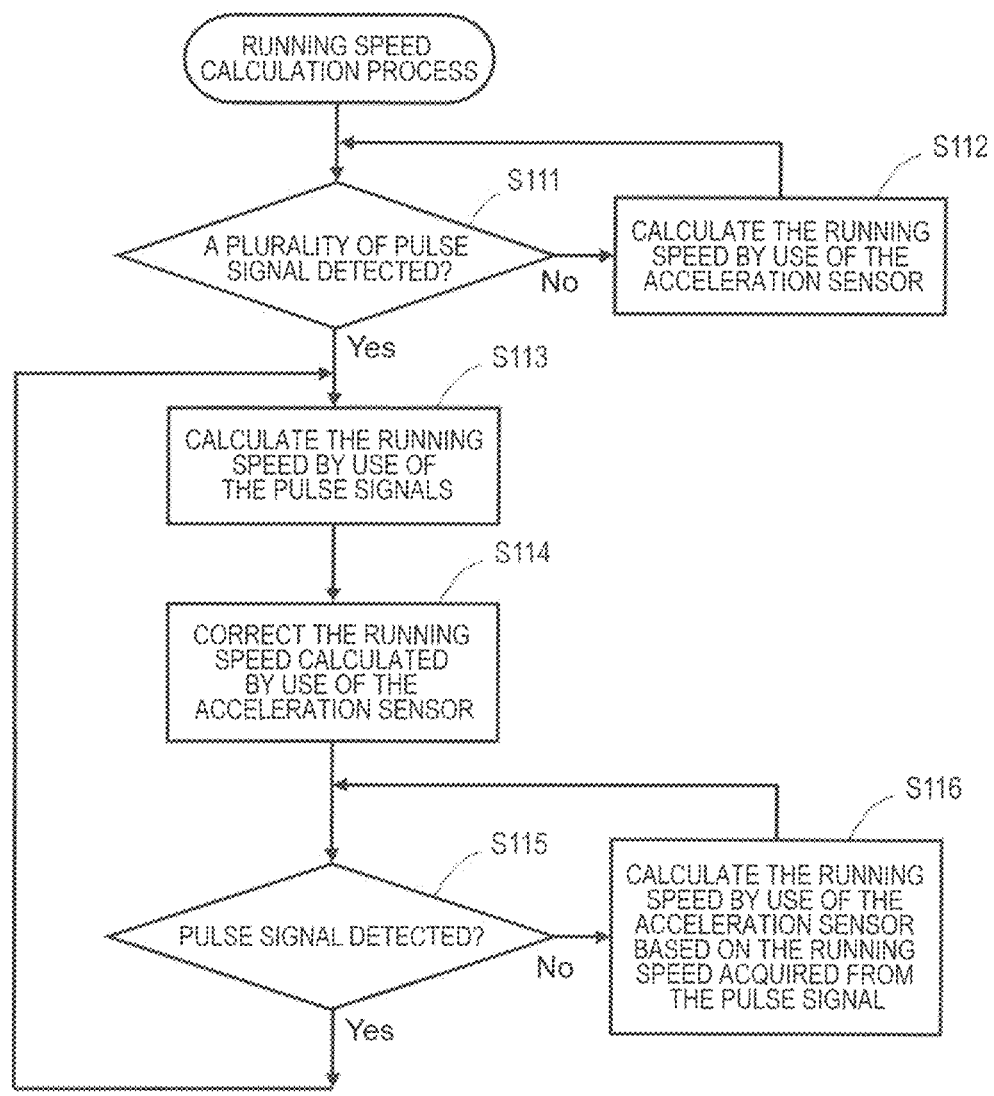
FIG. 6 is a flowchart showing a process of calculating a speed according to a preferred embodiment of the present invention.
Figure 7:
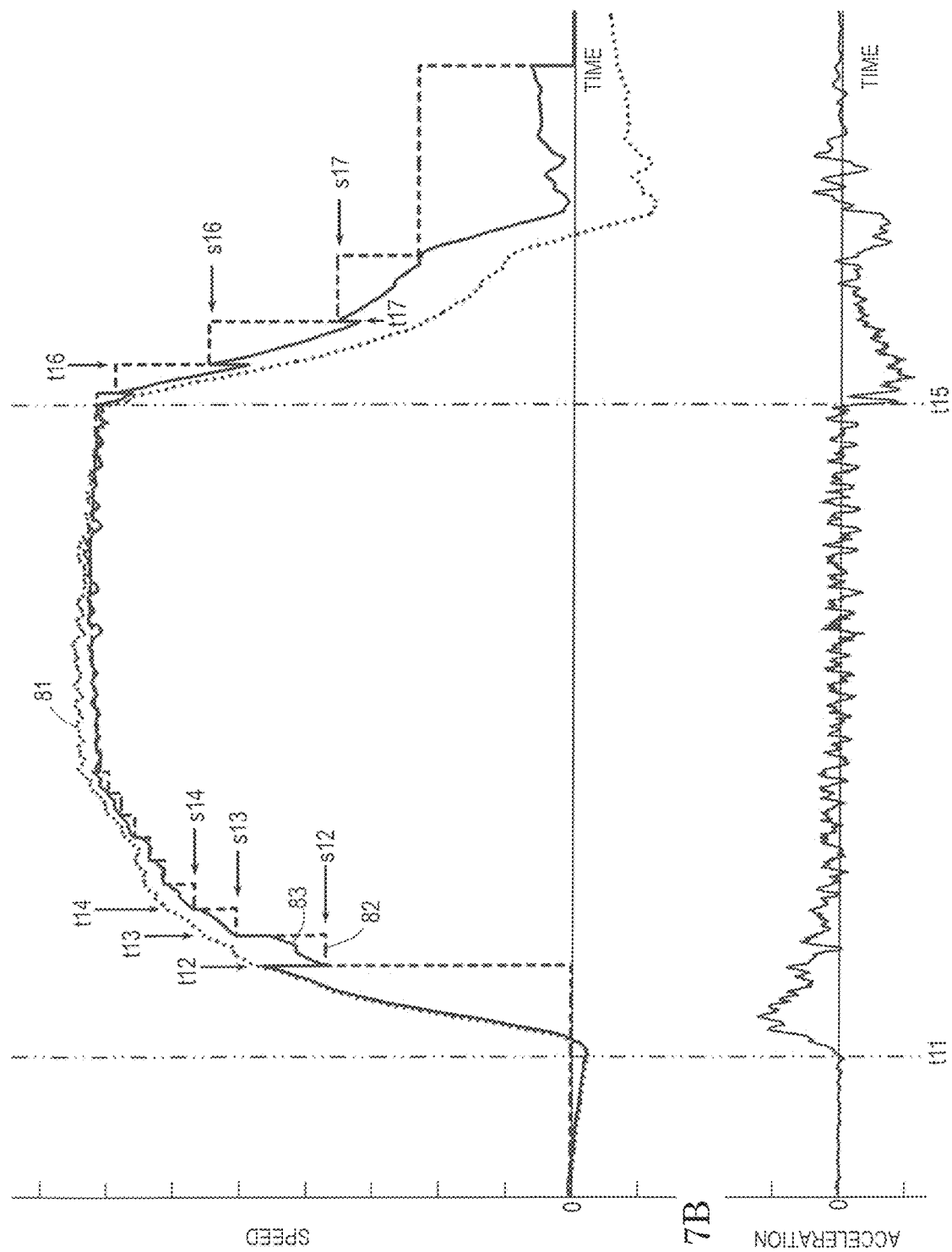
FIGS. 7A and 7B show a process of calculating a speed according to a preferred embodiment of the present invention.

FIG. 6 is a flowchart showing a process of calculating the speed of the electric assist bicycle 1 by using the wheel rotation sensor 35 and the acceleration sensor 38. FIGS. 7A and 7B shows the process of calculating the speed of the electric assist bicycle 1 by using the wheel rotation sensor 35 and the acceleration sensor 38.

As described above, each time the rear wheel 26 rotates by a predetermined angle, the wheel rotation sensor 35 outputs a pulse signal. As described above with reference to, for example, FIG. 3, in a preferred embodiment of the present invention in which the rear wheel 26 is provided with one permanent magnet 35m of the wheel rotation sensor 35, each time the rear wheel 26 rotates once, the wheel rotation sensor 35 outputs one pulse signal. During a time period after the wheel rotation sensor 35 outputs one pulse signal but before the wheel rotation sensor 35 outputs another pulse signal, the electric assist bicycle 1 moves by a distance corresponding to the outer circumferential length of the rear wheel 26. The calculation circuit 71 may use a time period after one pulse signal output by the wheel rotation sensor 35 is detected but before the another pulse signal output by the wheel rotation sensor 35 is detected, and also use the outer circumferential length of the rear wheel 26, to calculate the speed of the vehicle.

However, in the case where the rotation speed of the rear wheel 26 is low, for example, immediately after the vehicle starts or immediately before the vehicle stops, the time period after the calculation circuit 71 detects one pulse signal but before the calculation circuit 71 detects another pulse signal is long. During this time period, the speed cannot be updated. In this preferred embodiment of the present invention, during the time period in which no pulse signal is detected, the speed is calculated based on the output signal of the acceleration sensor 38 and thus is continually updated. Accordingly, even during the time period in which the speed cannot be detected by the wheel rotation sensor 35, the electric assist bicycle 1 may be controlled in accordance with the speed during the time period.

In FIG. 7A, the vertical axis represents the speed of the electric assist bicycle 1 in the traveling direction thereof. In FIG. 7A, the horizontal axis represents the time. In FIG. 7B, the vertical axis represents the acceleration, of the electric assist bicycle 1 in the traveling direction thereof, that is acquired from the output signal of the acceleration sensor 38. In FIG. 7B, the horizontal axis represents the time. In FIG. 7A, the dotted line represents a speed 81, of the vehicle, which is acquired from the output signal of the acceleration sensor 38 (hereinafter, the speed 81 will be referred to as an "acceleration sensor speed"). In FIG. 7A, the dashed line represents a speed 82, of the vehicle, which is acquired from the output signal of the wheel rotation sensor 35 (hereinafter, the speed 82 will be referred to as a "wheel rotation sensor speed"). In FIG. 7A, the solid line represents a speed 83, of the vehicle, which is acquired by a calculation performed based on both of the output signal of the acceleration sensor 38 and the output signal of the wheel rotation sensor 35 (hereinafter, the speed 83 will be referred to as an "estimated speed").

Referring to FIG. 6 and FIGS. 7A and 7B, the electric assist bicycle 1 is at a stop at time zero. While the electric assist bicycle 1 is at a stop, the calculation circuit 71 does not detect any pulse signal from the wheel rotation sensor 35, and calculates the acceleration sensor speed 81 based on the output signal of the acceleration sensor 38 (steps S111 and S112). The acceleration sensor speed 81 is the estimated speed 83. There is a case where the acceleration sensor speed 81 is not exactly zero by an external disturbance or the like, therefore the acceleration sensor speed 81 is of a value of zero or close to zero.

When the electric assist bicycle 1 starts at time t11, the acceleration sensor speed 81 increases. Until the rear wheel 26 performs at least more than one rotation (e.g., two rotations) after the electric assist bicycle 1 starts, the calculation circuit 71 does not detect a plurality of pulse signals. Therefore, the estimated speed 83 is matched to the acceleration sensor speed 81. Accordingly, during the time period in which the speed cannot be detected by the wheel rotation sensor 35, the calculation circuit 71 uses the acceleration sensor 38 to detect the speed.

When the rear wheel 26 performs more than one rotation and the calculation circuit 71 detects two pulse signals at time t12, the calculation circuit 71 uses the pulse signals to calculate the rotation sensor speed 82 (step S113). The calculation circuit 71 performs a correction of matching the estimated spewed 83, matched to the acceleration sensor speed 81, to the rotation sensor speed 82 (step S114). At time t12, the rotation sensor speed 82 has a magnitude s12, and the calculation circuit 71 corrects the magnitude of the estimated spewed 83 to s12.

During a time period after the pulse signals are detected at time t12 but before another pulse signal is detected at time t13, the calculation circuit 71 does not detect any pulse signal. During this time period in which no pulse signal is detected, the calculation circuit 71 uses the acceleration sensor speed 81 to calculate the estimated speed 83 (steps S115 and S116). In this time period, the calculation circuit 71 calculates the estimated speed 83 based on the acceleration sensor speed 81 based on the magnitude s12 of the rotation sensor speed 82. Specifically, referring to the graph shown in FIG. 7A, the estimated speed 83 is increased from the magnitude s12 to have the same or substantially the same inclination as that of the acceleration sensor speed 81 represented by the dotted line.

At time t13, the calculation circuit 71 newly detects a pulse signal. The calculation circuit 71 uses the newly detected pulse signal and the pulse signal detected immediately previously to calculate a rotation sensor speed 82 (step S113). The calculation circuit 71 performs a correction of matching the estimated speed 83, calculated based on the acceleration sensor speed 81 based on the magnitude s12, to the new rotation sensor speed 82 (step S114). At time t13, the rotation sensor speed 82 has a magnitude s13, and the calculation circuit 71 corrects the magnitude of the estimated speed 83 to s13.

During the time period in which no pulse signal is detected, the calculation circuit 71 uses the output signal of the acceleration sensor 38 to calculate the speed. By contrast, at a timing when a pulse signal is detected, the wheel rotation sensor 35 may provide a higher detection precision of the speed than the acceleration sensor 38. Therefore, at a timing when a pulse signal is detected, the speed acquired by using the acceleration sensor 38 is corrected to the speed acquired by using the wheel rotation sensor 35. After performing such a correction, the calculation circuit 71 calculates the speed by using the acceleration sensor 38 during the time period in which no pulse signal is detected. Accordingly, the precision of the speed continually updated based on the output signal of the acceleration sensor 38 may be increased.

During a time period after the pulse signal is detected at time t13 but before another pulse signal is detected at time t14, the calculation circuit 71 does not detect any pulse signal. During this time period in which no pulse signal is detected, the calculation circuit 71 uses the acceleration sensor speed 81 to calculate the estimated speed 83 (steps S115 and S116). Similar to the above description, the calculation circuit 71 calculates the estimated speed 83 based on the acceleration sensor speed 81 based on the size s13 of the rotation sensor speed 82.

At time t14, the calculation circuit 71 newly detects a pulse signal and calculates a rotation sensor speed 82 (step S113). The calculation circuit 71 performs a correction of matching the estimated speed 83, calculated based on the acceleration sensor speed 81 based on the magnitude s13, to the new rotation sensor speed 82 having a magnitude s14 (step S114). Accordingly, the calculation circuit 71 uses the acceleration sensor speed 81 and the rotation sensor speed 82 to continually calculate the estimated speed 83.

At time t15, the speed of the electric assist bicycle 1 starts decreasing. Upon detecting a pulse signal at time t16, the calculation circuit 71 calculates a rotation sensor speed 82. The calculation circuit 71 performs a correction of matching the estimated speed 83 to the new rotation sensor speed 82 having a magnitude s16.

During a time period after the pulse signal is detected at time t16 but before another pulse signal is detected at time t17, the calculation circuit 71 does not detect any pulse signal. During this time period in which no pulse signal is detected, the calculation circuit 71 uses the acceleration sensor speed 81 to calculate the estimated speed 83. Similar to the above description, the calculation circuit 71 calculates the estimated speed 83 based on the acceleration sensor speed 81 based on the size s16 of the rotation sensor speed 82. Upon detecting the pulse signal at time t17, the calculation circuit 71 calculates a rotation sensor speed 82. The calculation circuit 71 performs a correction of matching the estimated speed 83 to the new rotation sensor speed 82 having a magnitude s17. Accordingly, the calculation circuit 71 uses the acceleration sensor speed 81 and the rotation sensor speed 82 to continually calculate the estimated speed 83.

In this preferred embodiment of the present invention, during the time period in which no pulse signal is detected, the speed is calculated based on the output signal of the acceleration sensor 38 and thus is continually updated. Accordingly, even during the time period in which the speed cannot be detected by the wheel rotation sensor 35, the electric assist bicycle 1 may be controlled in accordance with the speed during the time period.

The wheel rotation sensor 35 detects the rotation of the rear wheel 26. Alternatively, the wheel rotation sensor 35 may detect the rotation of the front wheel 25. Also in a preferred embodiment of the present invention in which the wheel rotation sensor 35 detects the rotation of the front wheel 25, the speed of the electric assist bicycle 1 may be calculated similar to the calculations as described above.

Now, a process of calculating a gear ratio of the power transmission mechanism of the electric assist bicycle 1 based on the output signal of the motor rotation sensor 46 and the output signal of the acceleration sensor 38 will be described.

In the above-described example, the electric assist bicycle 1 includes the gear position sensor 48, which outputs a signal representing a gear position of the gearshift mechanism 36. In the example described below, a process of acquiring a gear ratio by a calculation in the case where the electric assist bicycle 1 does not include the gear position sensor 48 or in the case where the gear position sensor 48 malfunctions.

The electric assist bicycle 1 in this preferred embodiment of the present invention controls the magnitude of the assist power to be generated by the electric motor 53 in accordance with the gear ratio of the power transmission mechanism. In the case where, for example, the gear ratio is low, the magnitude of the assist power is decreased. A state where "the gear ratio is low" is also represented by the expression "low gear", and refers to a gear ratio at which the rotation speed of the rear wheel 26 is significantly decreased with respect to the rotation speed of the electric motor 53. By contrast, a state where "the gear ratio is high" is also represented by the expression "high gear", and refers to a gear ratio at which the rotation speed of the rear wheel 26 is decreased at a low ratio with respect to the rotation speed of the electric motor 53.

It is considered that as gear ratio is lower, the pedals 55 are rotated more easily by the human power applied thereto. Therefore, if large assist power is generated in the case where the gear ratio is low, the rider may feel some discomfort. Accordingly, in the case where the gearshift mechanism 36 is set to have a low gear ratio, the magnitude of the assist power is decreased to significantly reduce or prevent the discomfort felt by the rider. For example, the memory 72 (FIG. 2) has stored thereon a map by which the gear ratio is one of a plurality of parameters. The calculation circuit 71 refers to such a map to calculate a command value that causes the electric motor 53 to be driven.

A process of acquiring a gear ratio by a calculation will be described. In a preferred embodiment of the present invention in which the electric assist bicycle 1 includes a built-in transmission, the gear ratio of the power transmission mechanism is, for example, a gear ratio between the drive sprocket 59, the chain 28, the driven sprocket 32, the driving shaft 33 and the gearshift mechanism 36. In a preferred embodiment of the present invention in which the electric assist bicycle 1 is provided with an external transmission, the gear ratio of the power transmission mechanism is, for example, a gear ratio between the drive sprocket 59, the chain 28 and the driven sprocket 32. In this example, it is assumed that the output shaft of the decelerator 45 and the drive sprocket 59 have an equal or substantially equal rotation speed to each other. As the gear ratio of the power transmission mechanism, the gear ratio $r_{36}$ between the output shaft of the decelerator 45 and the rear wheel 26 is calculated.

The gear ratio $r_{36}$ may be represented by expression 3 below based on expression 1 presented above.

$$r_{36} = V_1/(60 \times R_{53} \times r_{45} \times C_{26}) \quad \text{(expression 3)}$$

The deceleration ratio $r_{45}$ of the decelerator 45 and the outer circumferential length $C_{26}$ of the rear wheel 26 are fixed values. Therefore, where the constant value is A, the gear ratio $r_{36}$ may be represented by expression 4 below.

$$r_{36} = A \times V_1/R_{53} \quad \text{(expression 4)}$$

Namely, the gear ratio $r_{36}$ may be determined by a calculation as long as the speed $V_1$ of the electric assist bicycle 1 and the number of rotations $R_{53}$ of the electric motor 53 are determined.

However, as described above, in a state where the rotation speed of the rear wheel 26 is low, for example, immediately after the electric assist bicycle 1 starts or immediately before the electric assist bicycle 1 stops, the wheel rotation sensor 35 requires a long time to output a pulse signal. Therefore, the calculation circuit 71 needs a long time to calculate the speed $V_1$ of the vehicle by using only the wheel rotation sensor 35. Accordingly, the calculation circuit 71 needs a long time also to calculate the gear ratio $r_{36}$. Under such a situation, in this preferred embodiment of the present invention, the speed $V_1$ calculated based on the output signal of the acceleration sensor 38 is used to calculate the gear ratio $r_{36}$. Accordingly, even in a state where the rotation speed of the rear wheel 26 is low, the calculation circuit 71 may control the electric motor 53 in accordance with the gear ratio.

Figure 8:
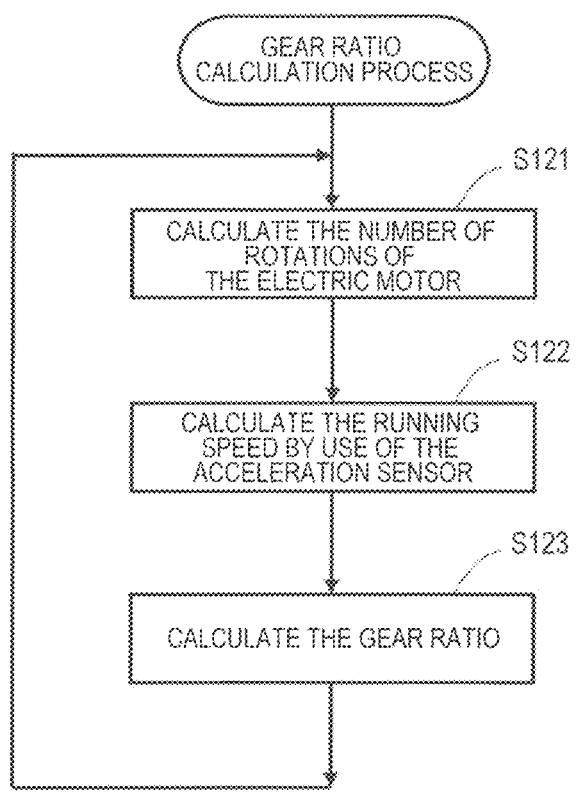
FIG. 8 is a flowchart showing a process of calculating a gear ratio according to a preferred embodiment of the present invention.

FIG. 8 is a flowchart showing a process of calculating the gear ratio. In step S121, the calculation circuit 71 calculates the number of rotations $R_{53}$ of the electric motor 53 based on the output signal of the motor rotation sensor 46. Next, in step S122, the calculation circuit 71 calculates the speed $V_1$ based on the output signal of the acceleration sensor 38. The calculation circuit 71 may integrate the acceleration, of the vehicle in the traveling direction thereof, that is acquired from the output signal of the acceleration sensor 38 to acquire the speed $V_1$. Next, in step S123, the calculation circuit 71 calculates the gear ratio $r_{36}$ based on the number of rotations $R_{53}$ of the electric motor 53 and the speed $V_1$ of the vehicle.

Accordingly, the gear ratio $r_{36}$ is calculated based on the output signal of the acceleration sensor 38. Therefore, even in a state where the rotation speed of the rear wheel 26 is low, for example, immediately after the electric assist bicycle 1 starts or immediately before the electric assist bicycle 1 stops, the gear ratio $r_{36}$ may be determined by a calculation. Since the gear ratio $r_{36}$ is determined, the calculation circuit 71 may control the electric motor 53 in accordance with the gear ratio even in a state where the rotation speed of the rear wheel 26 is low.

Now, a process of calculating the speed of the electric assist bicycle 1 by using the motor rotation sensor 46, the wheel rotation sensor 35 and the acceleration sensor 38 will be described.

FIG. 9 is a flowchart showing a process of calculating the speed of the electric assist bicycle 1 by using the motor rotation sensor 46, the wheel rotation sensor 35 and the acceleration sensor 38.

As understood from the above-described example, the precision of the speed of the vehicle calculated based on the output signal of the motor rotation sensor 46 is relatively high. However, under the conditions where the one-way clutch 37 (FIG. 2) does not transmit the rotation of the electric motor 53 to the rear wheel 26, the speed determined from the number of rotations of the electric motor 53 and the actual speed of the vehicle may be of different values from each other. The precision of the speed calculated based on the output signal of the wheel rotation sensor 35 is high in a high-speed range, but is low in a low-speed range. The precision of the speed calculated based on the output signal of the acceleration sensor 38 is relatively low, but the output signal of the acceleration sensor 38 enables the speed to be calculated constantly. In this preferred embodiment of the present invention, the speed is calculated while the shortages of the motor rotation sensor 46, the wheel rotation sensor 35 and the acceleration sensor 38 are compensated for by each other. Accordingly, the speed of the vehicle may be detected continually and stably under any of various conditions.

Referring to FIG. 9, when the rider presses the power switch 65 (FIG. 4) to turn the electric assist bicycle 1 into an ON state from an OFF state, the calculation circuit 71 sets the speed of the vehicle to zero as an initial setting value (step S131).

Next, in step S132, the calculation circuit 71 determines whether or not a torque of at least a predetermined level has been generated at the crankshaft 57 based on an output signal of the torque sensor 41. When the rider steps on the pedal 55 with his/her foot, a torque of at least the predetermined level is generated at the crankshaft 57. As described above, the torque sensor 41 detects the human power applied by the rider to the pedal 55 as a torque generated at the crankshaft 57. In the case where a torque of at least the predetermined level has been generated at the crankshaft 57, the controller 70 performs a control of causing the electric motor 53 to generate assist power.

In the case of determining that a torque of at least the predetermined level has been generated at the crankshaft 57, the calculation circuit 71 uses the output signal of the motor rotation sensor 46 to calculate the number of rotations of the electric motor 53 (step S133). Next, in step S134, the calculation circuit 71 determines whether or not the number of rotations acquired from the output signal of the motor rotation sensor 46 is at least a predetermined number of rotations.

The "predetermined number of rotations" is, for example, the number of rotations of the electric motor 53 corresponding to a speed at which the electric assist bicycle 1 may be considered to be at a stop. The predetermined number of rotations is, for example, the number of rotations of the electric motor 53 corresponding to a speed lower than about 10 cm per second. In an example, the predetermined number of rotations is 60 (rpm). This value of the number of rotations is merely an example, and does not limit the present invention.

In the case of determining, in step S134, that the number of rotations acquired from the output signal of the motor rotation sensor 46 is at least the predetermined number of rotations, the calculation circuit 71 advances the process to step S135. In step S135, the calculation circuit 71 uses the output signal of the motor rotation sensor 46 to calculate the speed of the vehicle. Upon calculating the speed, the calculation circuit 71 advances the process to step S140.

In step S140, the calculation circuit 71 determines whether or not an operation of turning off the system of the electric assist bicycle 1 has been performed. The "operation of turning off the system" is, for example, an operation of the rider pressing the power switch 65. In the case where the operation of turning off the system has not been performed, the process is returned to step S132. In the case where the operation of turning off the system has been performed, the process of calculating the speed is finished.

In the case of determining, in step S134, that the number of rotations acquired from the output signal of the motor rotation sensor 46 is lower than the predetermined number of rotations, the calculation circuit 71 sets the speed of the vehicle to zero. For example, a case where on a steep slope, the rider is stepping on the pedal 55 but the electric assist bicycle 1 is kept at a stop without moving will be discussed. In this case, it may occur that the electric motor 53 is kept at a stop although a driving current flows in the electric motor 53. A state where the electric motor 53 is kept at a stop although a driving current flows in the electric motor 53 may also occur, for example, in a state where the front wheel 25 is pressed onto a step on a sidewalk or in a state where the rider keeps his/her foot on the pedal 55 while braking the vehicle at the traffic lights. In a state where the electric assist bicycle 1 is substantially at a stop although the rider steps on the pedal 55, the calculation circuit 71 determines that the speed of the vehicle is zero. In the case of determining that the speed of the vehicle is zero, the calculation circuit 71 advances the process to step S140.

In the case of determining, in step S132, that a torque of at least the predetermined level has not been generated at the crankshaft 57, the calculation circuit 71 advances the process to step S137.

In step S137, the calculation circuit 71 determines whether or not a plurality of pulse signals from the wheel rotation sensor 35 were detected within a predetermined time period. In an example, the "predetermined time period" is 5 seconds. This value of the time period is merely an example, and does not limit the present invention.

In the case of having detected a plurality of pulse signals from the rotation sensor 35 within the predetermined time period, the calculation circuit 71 uses these pulse signals to calculate the speed of the vehicle (step S138). Next, in step S139, the calculation circuit 71 calculates the speed based on the output signal of the acceleration sensor 38 based on the current speed that has been calculated. As described above with reference to FIG. 6 and FIGS. 7A and 7B, during the time period in which no pulse signal is detected, the calculation circuit 71 uses the acceleration sensor 38 to calculate the speed. Accordingly, even during the time period in which no pulse signal is detected, the speed may be continually updated. Upon calculating the speed, the calculation circuit 71 advances the process to step S140.

In the case of not having detected a plurality of pulse signals within the predetermined time period in step S137, the calculation circuit 71 advances the process to step S139. In this case, the calculation circuit 71 calculates the speed based on the output signal of the acceleration sensor 38 based on the current speed already calculated. In the case where the current speed is zero, the calculation circuit 71 calculates the speed based on zero. As described above, in a state where the rotation speed of the rear wheel 26 is low, the calculation circuit 71 requires a long time to detect a pulse signal after detecting an immediately previous pulse signal. During this time period, the speed cannot be updated. In this case, the speed may be calculated based on the output signal of the acceleration sensor 38, so that the speed is continually updated. Accordingly, even during a time period in which the speed cannot be detected with the wheel rotation sensor 35, the electric assist bicycle 1 may be controlled in accordance with the speed during the time period.

Upon calculating the speed, the calculation circuit 71 advances the process to step S140. The calculation circuit 71 repeats the above-described process until the operation of turning off the system is performed.

The output signal of the motor rotation sensor 46, the output signal of the wheel rotation sensor 35 and the output signal of the acceleration sensor 38 may be used for different cases as described above, so that the speed of the vehicle is detected continually and stably in any of various conditions. Therefore, the electric assist bicycle 1 may be controlled in accordance with the speed under any of various conditions.

In the above, a two-wheel electric assist bicycle is described as the electric assist bicycle. The present invention is not limited to this specific structure. The electric assist bicycle may be an electric assist bicycle with three or more wheels.

In the above, the driving wheel to which the human power generated by the rider stepping on the pedal and the assist power generated by the electric motor are transmitted is the rear wheel. The present invention is not limited to this specific structure. The human power and the assist power may be transmitted to the front wheel, or both of the front wheel and the rear wheel, in accordance with the specific structural features of the electric assist bicycle.

A preferred embodiment of the present invention is described above.

As described above, the electric assist system 51 according to a preferred embodiment of the present invention includes the electric motor 53 that generates assist power assisting human power of a rider of the electric assist vehicle 1; the rotation sensors 35 and 46 that output a signal in accordance with a rotation of a rotatable component that rotates to operate the electric assist vehicle 1; and the acceleration sensor 38 that outputs a signal in accordance with an acceleration of the electric assist vehicle 1 in a traveling direction thereof. The electric assist system 51 further includes the controller 70 that calculates a speed of the electric assist vehicle 1 based on an output signal of at least one of the rotation sensors 35 and 46 and an output signal of the acceleration sensor 38.

According to a preferred embodiment of the present invention, the speed of the electric assist vehicle 1 is calculated by at least one of the rotation sensors 35 and 46 and the acceleration sensor 38 together. Under the conditions where it is difficult to detect the speed by using the rotation sensor 35 or 46, the acceleration sensor 38 is used to calculate the speed. Under the conditions where it is difficult to detect the speed by using the acceleration sensor 38, at least one of the rotation sensors 35 and 46 is used to calculate the speed. The speed of the vehicle may be detected continually under any of various conditions, and the electric assist vehicle 1 may be controlled in accordance with the speed.

In a preferred embodiment of the present invention, the controller 70 uses both of the output signal of the rotation sensor 35 or 46 and the output signal of the acceleration sensor 38 to calculate the speed under a first condition, and uses one of the output signal of the rotation sensor 35 or 46 and the output signal of the acceleration sensor 38 to calculate the speed under a second condition.

The sensor to be used to calculate the speed may be changed in accordance with the conditions, so that the speed of the vehicle is detected continually under any of various conditions.

In a preferred embodiment of the present invention, the controller 70 changes the sensor to be used to calculate the speed, between the rotation sensor 46 and the acceleration sensor 38, in accordance with the number of rotations acquired from the output signal of the rotation sensor 46.

The sensor to be used to calculate the speed may be changed to a sensor suitable to the current number of rotations, so that the speed of the vehicle is detected continually under any of various conditions.

In a preferred embodiment of the present invention, in the case where the number of rotations acquired from the output signal of the rotation sensor 46 is at least a predetermined number of rotations, the controller 70 uses both of the output signal of the rotation sensor 46 and the output signal of the acceleration sensor 38 to calculate the speed of the electric assist vehicle 1. In the case where the number of rotations acquired from the output signal of the rotation sensor 46 is lower than the predetermined number of rotations, the controller 70 uses the output signal of the acceleration sensor 38 to calculate the speed of the electric assist vehicle 1.

In the case where the number of rotations acquired from the rotation sensor 46 is low or zero, for example, immediately after the vehicle starts, immediately before the vehicle stops, or while the electric motor 53 is at a stop, it is difficult to detect the speed by using the rotation sensor 46. In the case where the number of rotations acquired from the rotation sensor 46 is lower than the predetermined number of rotations, the speed is calculated by using the acceleration sensor 38. Even under the conditions where it is difficult to detect the speed by using the rotation sensor 46, the speed may be detected by using the acceleration sensor 38, so that the electric assist vehicle 1 is controlled in accordance with the speed.

In a preferred embodiment of the present invention, in the case where the number of rotations acquired from the output signal of the rotation sensor 46 is at least the predetermined number of rotations, the controller 70 calculates a first speed based on the output signal of the rotation sensor 46, and calculates a second speed based on the output signal of the acceleration sensor 38. The controller 70 weights each of the first speed and the second speed, and uses both of the weighted first speed and the weighted second speed to calculate the speed of the electric assist vehicle 1.

The speed acquired from the rotation sensor 46 and the speed acquired from the acceleration sensor 38 are each weighted. The ratio at which the speed acquired from the sensor suitable to the current number of rotations is adopted may be set to be high, so that the detection precision of the speed is increased.

In a preferred embodiment of the present invention, in the case where the number of rotations acquired from the output signal of the rotation sensor 46 is at least the predetermined number of rotations, the controller 70 calculates a first speed based on the output signal of the rotation sensor 46, and calculates a second speed based on the output signal of the acceleration sensor 38. The controller 70 multiplies the first speed by a first coefficient and multiplies the second speed by a second coefficient, and uses both of the first speed multiplied by the first coefficient and the second speed multiplied by the second coefficient to calculate the speed of the electric assist vehicle 1.

The speed acquired from the rotation sensor 46 and the speed acquired from the acceleration sensor 38 are each multiplied by a coefficient. The ratio at which the speed acquired from the sensor suitable to the current number of rotations is adopted may be set to be high, so that the detection precision of the speed is increased.

In a preferred embodiment of the present invention, the controller 70 changes the sensor to be used to calculate the speed, between the rotation sensor 46 and the acceleration sensor 38, in accordance with a speed acquired from the output signal of the rotation sensor 46.

The sensor to be used to calculate the speed may be changed to a sensor suitable to the current number of rotations, so that the speed of the vehicle is detected continually under any of various conditions.

In a preferred embodiment of the present invention, the rotatable component is the electric motor 53, and the rotation sensor 46 outputs a signal in accordance with the rotation of the electric motor 53.

The signal in accordance with the rotation of the electric motor 53 and the output signal of the acceleration sensor 38 are used together to calculate the speed of the electric assist vehicle 1. Even under the conditions where the speed cannot be detected by the rotation sensor 46, for example, even in a state where the electric motor 53 is at a stop, the speed may be detected by the acceleration sensor 38, and the electric assist vehicle 1 may be controlled in accordance with the speed.

In a preferred embodiment of the present invention, the rotatable component is the wheel 25 or 26 of the electric assist vehicle 1, and the rotation sensor 35 outputs a signal in accordance with a rotation of the wheel 25 or 26.

The signal in accordance with the rotation of the wheel 25 or 26 and the output signal of the acceleration sensor 38 are used together to calculate the speed of the electric assist vehicle 1. In the case where the rotation of each of the wheels 25 and 26 is low, for example, immediately after the vehicle starts or immediately before the vehicle stops, it is difficult to detect the speed by using the rotation sensor 35. Even under the conditions where it is difficult to detect the speed by using the rotation sensor 35, the speed may be detected by using the acceleration sensor 38, so that the electric assist vehicle 1 is controlled in accordance with the speed.

In a preferred embodiment of the present invention, the rotation sensor 35 outputs a pulse signal each time the wheel 25 or 26 rotates by a predetermined angle. The controller 70 calculates the speed based on two or more pulse signals. During a time period in which no pulse signal is detected, the controller 70 uses the output signal of the acceleration sensor 38 to calculate the speed.

During the time period in which the rotation sensor 35 outputs no pulse signal, the speed cannot be detected based on any pulse signal. During the time period in which the speed cannot be detected by the rotation sensor 35, the output signal of the acceleration sensor 38 is used to detect the speed. Accordingly, even during the time period in which the speed cannot be detected by the rotation sensor 35, the electric assist vehicle 1 may be controlled in accordance with the speed.

In a preferred embodiment of the present invention, the rotation sensor 35 outputs a pulse signal each time the wheel 25 or 26 rotates by a predetermined angle. The controller 70 calculates the speed based on two or more pulse signals. During a time period after one pulse signal is detected but before the next pulse signal is detected, the controller 70 uses the output signal of the acceleration sensor 38 to calculate the speed.

During the time period after the rotation sensor 35 outputs one the pulse signal but before the rotation sensor 35 outputs the next pulse signal, the speed cannot be detected based on any pulse signal. During the time period in which the speed cannot be detected by the rotation sensor 35, the acceleration sensor 38 is used to detect the speed. Accordingly, even during the time period in which the speed cannot be detected by the rotation sensor 35, the electric assist vehicle 1 may be controlled in accordance with the speed.

In a preferred embodiment of the present invention, upon detecting a pulse signal, the controller 70 calculates the speed based on the pulse signal just detected and a pulse signal detected immediately previously. The controller 70 corrects a magnitude of the speed acquired from the output signal of the acceleration sensor 38 to a magnitude of the speed acquired from the pulse signals.

During the time period in which no pulse signal is detected, the acceleration sensor 38 is used to detect the speed. By contrast, at a timing when a pulse signal is detected, the rotation sensor 35 may provide a higher detection precision of the speed than the acceleration sensor 38. In this case, the magnitude of the speed acquired by using the acceleration sensor 38 is corrected to a magnitude of the speed acquired by using the rotation sensor 35. After such a correction, the speed is detected by the acceleration sensor 38 during the time period in which no pulse signal is detected. Accordingly, the precision of the speed may be increased.

In a preferred embodiment of the present invention, in a time period after one pulse signal is detected but before the next pulse signal is detected, the controller 70 calculates the speed based on the output signal of the acceleration sensor 38 based on the speed acquired from the pulse signal.

The speed may be calculated based on the output signal of the acceleration sensor 38 indicative the speed detected by the rotation sensor 35. Accordingly, the detection precision of the speed by the acceleration sensor 38 may be increased.

In a preferred embodiment of the present invention, the rotatable component is the electric motor 53, and the rotation sensor 46 outputs a signal in accordance with the rotation of the electric motor 53. The controller 70 calculates a gear ratio of the power transmission mechanism included in the electric assist vehicle 1 based on the output signal of the rotation sensor 46 and the output signal of the acceleration sensor 38.

In the case where the speed is low, for example, immediately after the vehicle starts or immediately before the vehicle stops, it is difficult to detect the speed by the rotation sensor 35. However, using the acceleration sensor 38 enables the speed to be detected. The number of rotations of the electric motor 53 may be calculated from the output signal of the rotation sensor 46. The gear ratio of the power transmission mechanism is calculated from the speed detected by using the acceleration sensor 38 and the number of rotations of the electric motor 53 detected by using the rotation sensor 46. Accordingly, the electric assist vehicle 1 may be controlled in accordance with the gear ratio.

In a preferred embodiment of the present invention, the electric assist system 51 further includes the rotation sensor 46 that outputs a signal in accordance with the rotation of the electric motor 53. The controller 70 calculates a gear ratio of the power transmission mechanism included in the electric assist vehicle 1 based on the signal in accordance with the rotation of the electric motor 53 and the output signal of the acceleration sensor 38.

In the case where the rotation of each of the wheels 25 and 26 is low, for example, immediately after the vehicle starts or immediately before the vehicle stops, a long time is needed for a signal in accordance with the rotation of the wheel 25 or 26 to be output. In such a state, the speed cannot be calculated, or it requires a long time to calculate the speed. Even in such a case, using the acceleration sensor 38 enables the speed to be detected. The number of rotations of the electric motor 53 may be calculated from the output signal of the rotation sensor 46. The gear ratio of the power transmission mechanism may be calculated from the speed detected by the acceleration sensor 38 and the number of rotations of the electric motor 53 detected by the rotation sensor 46. Accordingly, the electric assist vehicle 1 may be controlled in accordance with the gear ratio.

The electric assist system 51 according to a preferred embodiment of the present invention includes the electric motor 53 that generates assist power assisting human power of a rider of the electric assist vehicle 1; the rotation sensor 46 that outputs a signal in accordance with the rotation of the electric motor 53; and the acceleration sensor 38 that outputs a signal in accordance with an acceleration of the electric assist vehicle 1 in a traveling direction thereof. The electric assist system 51 further includes the controller 70 calculating a gear ratio of the power transmission mechanism included in the electric assist vehicle 1 based on the output signal of the rotation sensor 46 and the output signal of the acceleration sensor 38.

The speed may be detected by the acceleration sensor 38, and the number of rotations of the electric motor 53 may be detected by the rotation sensor 46. The gear ratio of the transmission may be calculated from the detected speed and the detected number of rotations of the electric motor 53, and the electric assist vehicle 1 may be controlled in accordance with the gear ratio.

The electric assist vehicle 1 according to a preferred embodiment of the present invention includes the electric assist system 51 described above. Thus, the electric assist vehicle 1 including the features of the electric assist system 51 described above is provided.

Some preferred embodiments of the present invention have been described. The above description of the preferred embodiments provides an illustrative example of the present invention, but does not limit the present invention. A preferred embodiment in which elements described in the above-described preferred embodiments are combined appropriately may be provided. The elements may be, for example, modified, replaced, added or deleted within the scope of the claims of the present invention and equivalents thereof.

Preferred embodiments of the present invention are applicable to vehicles that include an acceleration sensor and are driven by human power assisted by assist power.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric assist system for an electric assist vehicle, the electric assist system comprising:
   an electric motor that generates assist power to assist human power of a rider of the electric assist vehicle;
   a rotation sensor that outputs an output signal in accordance with a rotation of a rotatable component that rotates to operate the electric assist vehicle;
   an acceleration sensor that outputs an output signal in accordance with an acceleration of the electric assist vehicle in a traveling direction thereof; and
   a controller that calculates a speed of the electric assist vehicle based on the output signal of the rotation sensor and the output signal of the acceleration sensor; wherein
   under a first condition, the controller calculates the speed based on both of the output signal of the rotation sensor and the output signal of the acceleration sensor; and
   under a second condition, the controller calculates the speed based on the output signal of the acceleration sensor.

2. The electric assist system of claim 1, wherein the controller changes between calculating the speed based on the output signal of the rotation sensor and calculating the speed based on the output signal of the acceleration sensor, in accordance with a number of rotations acquired from the output signal of the rotation sensor.

3. The electric assist system of claim 1, wherein the controller changes between calculating the speed based on the output signal of the rotation sensor and calculating the speed based on the output signal of the acceleration sensor, in accordance with a speed acquired from the output signal of the rotation sensor.

4. The electric assist system of claim 1, wherein
   the rotatable component is the electric motor; and
   the rotation sensor outputs the output signal in accordance with a rotation of the electric motor.

5. The electric assist system of claim 1, wherein
   the rotatable component is a wheel of the electric assist vehicle; and
   the rotation sensor outputs the output signal in accordance with a rotation of the wheel.

6. The electric assist system of claim 5, wherein
   the rotation sensor outputs a pulse signal each time the wheel rotates by a predetermined angle;
   the controller calculates the speed of the vehicle based on two or more of the pulse signals; and
   during a time period in which no pulse signal is detected, the controller calculates the speed of the vehicle based on the output signal of the acceleration sensor.

7. The electric assist system of claim 6, wherein upon detecting the pulse signal, the controller calculates the speed of the vehicle based on the detected pulse signal and a pulse signal that was most recently detected, and the controller corrects a magnitude of the speed acquired from the output signal of the acceleration sensor to a magnitude of the speed acquired from the pulse signals.

8. The electric assist system of claim 7, wherein during a time period after the pulse signal is detected but before a next pulse signal is detected, the controller calculates the speed of the vehicle based on the output signal of the acceleration sensor based on the speed acquired from the pulse signal.

9. The electric assist system of claim 5, wherein
   the rotation sensor outputs a pulse signal each time the wheel rotates by a predetermined angle;
   the controller calculates the speed based on two or more of the pulse signals; and
   during a time period after the pulse signal is detected but before a next pulse signal is detected, the controller calculates the speed of the vehicle based on the output signal of the acceleration sensor.

10. The electric assist system of claim 5, further comprising:
    a second rotation sensor that outputs an output signal in accordance with a rotation of the electric motor; wherein the controller calculates a gear ratio of a power transmission mechanism included in the electric assist vehicle based on the output signal of the second rotation sensor and the output signal of the acceleration sensor.

11. An electric assist vehicle including the electric assist system of claim 1.

12. An electric assist system for an electric assist vehicle, the electric assist system comprising:
- an electric motor that generates assist power to assist human power of a rider of the electric assist vehicle;
- a rotation sensor that outputs an output signal in accordance with a rotation of a rotatable component that rotates to operate the electric assist vehicle;
- an acceleration sensor that outputs an output signal in accordance with an acceleration of the electric assist vehicle in a traveling direction thereof; and
- a controller that calculates a speed of the electric assist vehicle based on the output signal of the rotation sensor and the output signal of the acceleration sensor; wherein
- in a case where a number of rotations acquired from the output signal of the rotation sensor is at least a predetermined number of rotations, the controller calculates the speed of the electric assist vehicle based on both of the output signal of the rotation sensor and the output signal of the acceleration sensor; and
- in a case where the number of rotations acquired from the output signal of the rotation sensor is lower than the predetermined number of rotations, the controller calculates the speed of the electric assist vehicle based on the output signal of the acceleration sensor.

13. The electric assist system of claim 12, wherein in the case where the number of rotations acquired from the output signal of the rotation sensor is at least the predetermined number of rotations, the controller:
- calculates a first speed based on the output signal of the rotation sensor;
- calculates a second speed based on the output signal of the acceleration sensor;
- weights each of the first speed and the second speed; and
- calculates the speed of the electric assist vehicle based on both of the weighted first speed and the weighted second speed.

14. The electric assist system of claim 12, wherein, in the case where the number of rotations acquired from the output signal of the rotation sensor is at least the predetermined number of rotations, the controller:
- calculates a first speed based on the output signal of the rotation sensor;
- calculates a second speed based on the output signal of the acceleration sensor;
- multiplies the first speed by a first coefficient and multiplies the second speed by a second coefficient; and
- calculates the speed of the electric assist vehicle based on both of the first speed multiplied by the first coefficient and the second speed multiplied by the second coefficient.

15. An electric assist system for an electric assist vehicle, the electric assist system comprising:
- an electric motor that generates assist power to assist human power of a rider of the electric assist vehicle;
- a rotation sensor that outputs an output signal in accordance with a rotation of a rotatable component that rotates to operate the electric assist vehicle;
- an acceleration sensor that outputs an output signal in accordance with an acceleration of the electric assist vehicle in a traveling direction thereof; and
- a controller that calculates a speed of the electric assist vehicle based on the output signal of the rotation sensor and the output signal of the acceleration sensor; wherein
- the rotatable component is the electric motor;
- the rotation sensor outputs the output signal in accordance with a rotation of the electric motor; and
- the controller calculates a gear ratio of a power transmission mechanism included in the electric assist vehicle based on the output signal of the rotation sensor and the output signal of the acceleration sensor.

16. An electric assist system for an electric assist vehicle, the electric assist system comprising:
- an electric motor that generates assist power to assist human power of a rider of the electric assist vehicle;
- a rotation sensor that outputs an output signal in accordance with a rotation of the electric motor;
- an acceleration sensor that outputs an output signal in accordance with an acceleration of the electric assist vehicle in a traveling direction thereof; and
- a controller that calculates a gear ratio of a power transmission included in the electric assist vehicle based on the output signal of the rotation sensor and the output signal of the acceleration sensor.

17. An electric assist vehicle including the electric assist system of claim 16.

18. The electric assist system of claim 16, further comprising a gear position sensor that outputs to the controller data representing a gear position of the power transmission.

19. The electric assist system of claim 16, wherein the controller decreases the assist power in response to the gear ratio being lowered.

* * * * *